United States Patent
Chen

(10) Patent No.: US 6,278,466 B1
(45) Date of Patent: Aug. 21, 2001

(54) CREATING ANIMATION FROM A VIDEO

(75) Inventor: Shenchang Eric Chen, Los Gatos, CA (US)

(73) Assignee: Presenter.Com, Inc., Almaden, CA (US)

( * ) Notice: Subject to any disclaimer, the term of this patent is extended or adjusted under 35 U.S.C. 154(b) by 0 days.

(21) Appl. No.: 09/096,720

(22) Filed: Jun. 11, 1998

(51) Int. Cl.[7] .................................................. G06T 15/00
(52) U.S. Cl. ............................................. 345/473; 345/474
(58) Field of Search .................................. 345/473, 474, 345/418, 433, 475, 438, 439

(56) References Cited

U.S. PATENT DOCUMENTS 5,442,744 * 8/1995 Piech et al. ........................... 345/473

OTHER PUBLICATIONS

Seitz et al, "View Morphing", Department of Computer Sciences of University of Wisconsine–Madison, 10 papes, 1986.*

Lee et al, "Polymorph: Morphing Among Multiple Images", IEEE, pp 60–65, Jan. 1998.*

Studio DV (Trademark of Pinnacle System), pp. 4.1–4.15.*

* cited by examiner

Primary Examiner—Cliff N. Vo
(74) Attorney, Agent, or Firm—Blakely, Sokoloff, Taylor & Zafman, LLP

(57) ABSTRACT

An apparatus and method for creating an animation. A sequence of video images is inspected to identify a first transformation of a scene depicted in the sequence of video images. A first image and a second image are obtained from the sequence of video images, the first image representing the scene before the first transformation and the second image representing the scene after the first transformation. Information is generated that indicates the first transformation and that can be used to interpolate between the first image and the second image to produce a video effect that approximates display of the sequence of video images.

36 Claims, 16 Drawing Sheets

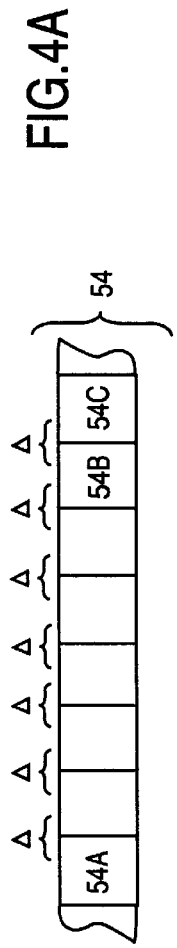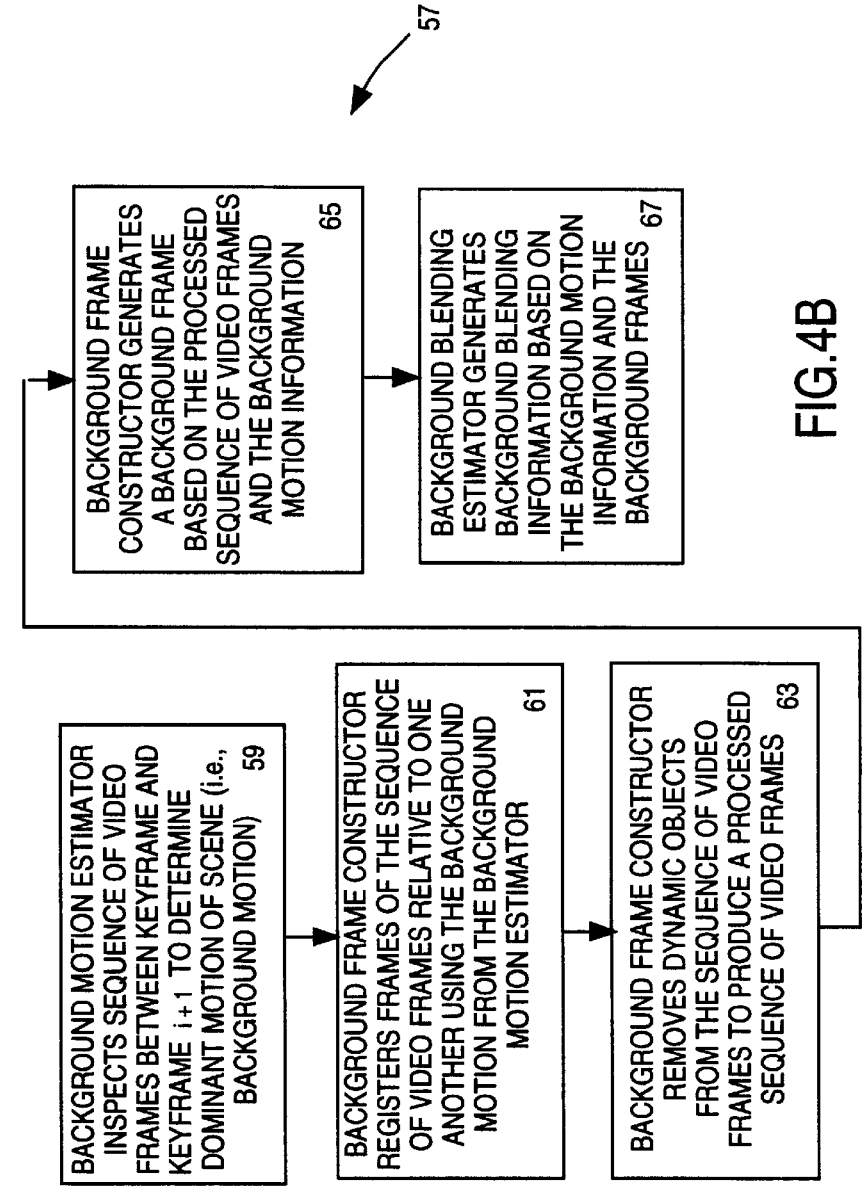
FIG.4A
FIG.4B

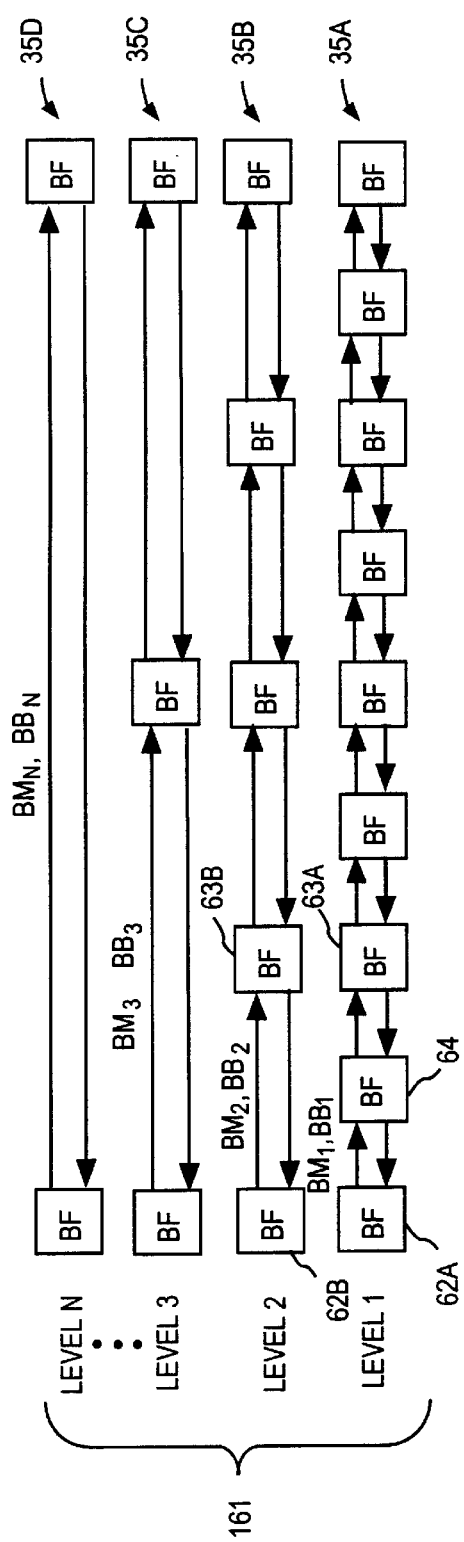
FIG. 11  MULTI-TEMPORAL RESOLUTION BACKGROUND TRACK
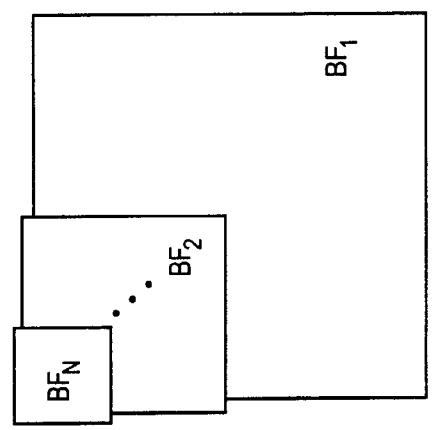
FIG. 12  MULTI-SPATIAL RESOLUTION BACKGROUND FRAME

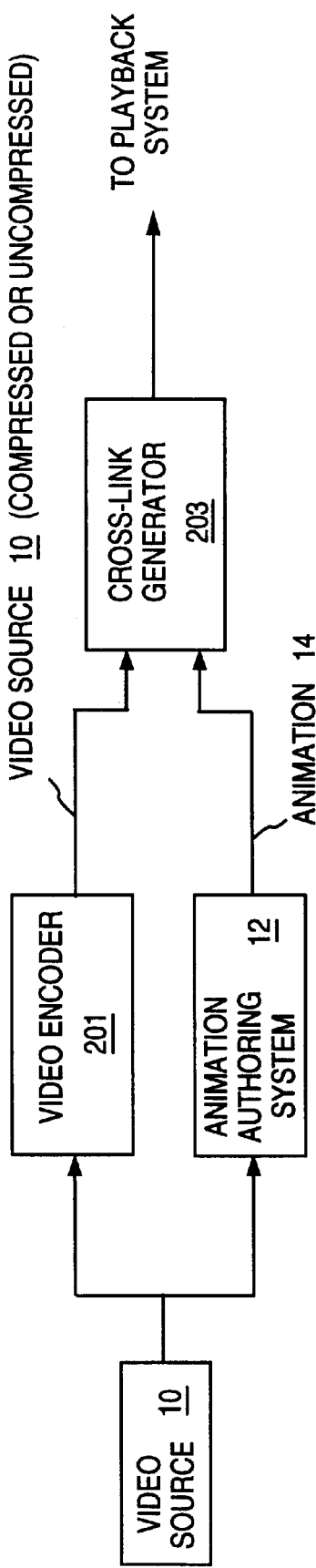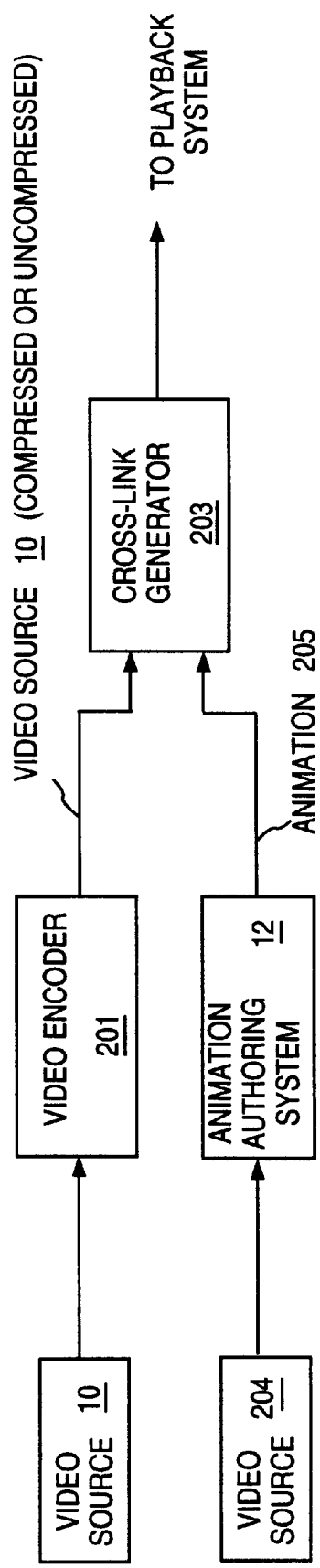

CREATING ANIMATION FROM A VIDEO

FIELD OF THE INVENTION

The present invention relates to the field of image animation, and more particularly to automatically creating an animation from a video.

BACKGROUND OF THE INVENTION

The Internet has become an increasingly popular medium for delivering full motion video to end users. Due to bandwidth constraints, however, most users are unable to download and view high quality video on demand. For example, to deliver a compressed 640 by 480 pixel resolution video at thirty frames per second, image data must be transmitted at approximately eight Mbs (mega-bits per second), a bandwidth requirement roughly three hundred times more than the 28.8 Kbs (kilo-bits per second) modem speed available to most Internet users today. Even using industry standard compression techniques (e.g., MPEG— Moving Picture Expert Group), video effects on the Internet today are usually more like a low-quality slide show than a television experience.

Animations, which use keyframes and interpolation to create video effects, potentially require much less bandwidth to transmit than video. With the improved performance of personal computers, television quality video effects can be synthesized in real-time from a relatively few keyframes that can be received using a low bandwidth modem. An animation sequence that requires transmission of a keyframe every few seconds can be delivered with an enormous bandwidth savings relative to video and yet provide exceptional image quality.

In addition to having a small bandwidth requirement, animations are also more scalable than videos in both playback image quality and frame rate. Because the video effects are synthesized on the fly during playback time, the frame rate and image quality can be dynamically adjusted based on a number of factors, such as playback processor speed, network bandwidth and user preferences.

Adding features for user interaction and other types of editing is also significantly easier with an animation than with a video. For instance, adjusting a camera panning path or object movement speed may only require changing motion parameters associated with a few keyframes in the animation. Editing a video clip to achieve the same effects may require modification of hundreds of frames. Similarly, attaching a hot spot that tracks a moving object over time can be achieved far easier in an animation than in a video.

Animation has its drawbacks. Because skilled human animators have traditionally been required to create high quality animation, the animation process is often costly and expensive. Further, because the human animators often sketch keyframes by hand, animation tends to appear cartoonish and usually lacks the lifelike imagery needed to depict real world scenes. In some cases animations are created using primitive two-dimensional and three-dimensional objects as building blocks. This type of animation also tends to have a synthetic rather than a natural appearance and is usually limited to presenting graphic information.

SUMMARY OF THE INVENTION

A method and apparatus for creating an animation are disclosed. A sequence of video images is inspected to identify a first transformation of a scene depicted in the sequence of video images. A first image and a second image are obtained from the sequence of video images. The first image represents the scene before the first transformation and the second image represents the scene after the first transformation. Information is generated that indicates the first transformation and that can be used to interpolate between the first image and the second image to produce a video effect that approximates display of the sequence of video images.

Other features and advantages of the invention will be apparent from the accompanying drawings and from the detailed description that follows below.

BRIEF DESCRIPTION OF THE DRAWINGS

The present invention is illustrated by way of example and not limitation in the figures of the accompanying drawings in which like references indicate similar elements and in which:

FIG. 4A illustrates a video segment that has been identified by a scene change estimator within a background track generator;

FIG. 4B is a flow diagram that describes the operations of the background motion estimator, background frame constructor and background blending estimator depicted in FIG. 3.

FIG. 11 illustrates a technique for providing multiple temporal resolutions of animation keyframes;

FIG. 12 illustrates a technique for providing multiple spatial resolutions of animation keyframes;

FIG. 14A illustrates the use of a cross-link generator to establish cross-links between a video source and an animation that has been created from the video source;

FIG. 14B illustrates the use of a cross-link generator to establish cross-links between a first video and an animation that has been created from second video;

DETAILED DESCRIPTION

Figure 1:
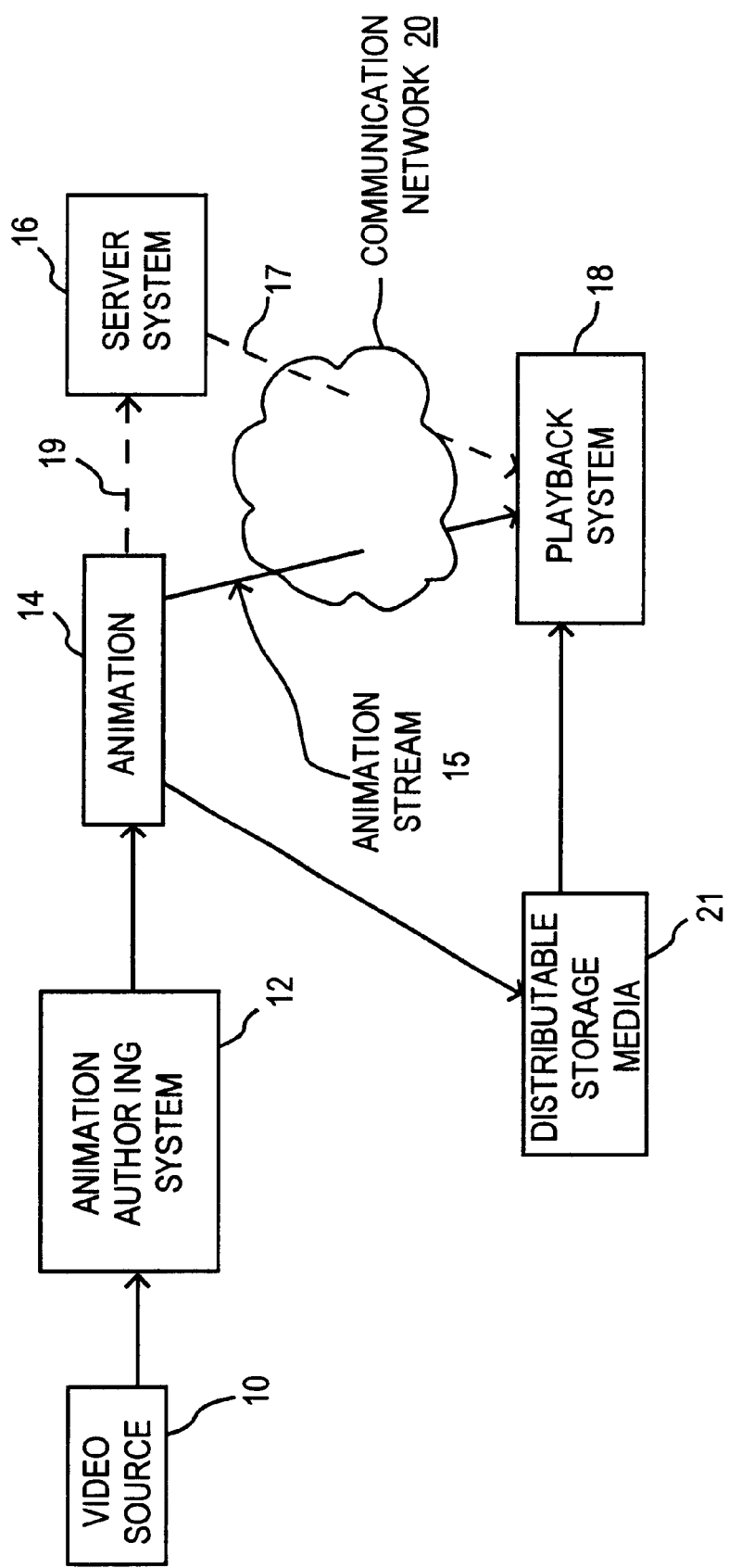
FIG. 1 illustrates creation and delivery of an animation.

According to embodiments described herein, a video is analyzed to automatically create an animation that includes keyframes and information for interpolating between the keyframes. The keyframes and interpolation information may be used to synthesize images on the fly during animation playback. When displayed, the synthesized images produce video effects that approximate the original video. Because video effects such as image motions and color changes can usually be represented with significantly less information in an animation than in a video, animations tend to consume much less bandwidth when transmitted via communication networks, such as the Internet. For example, using methods and apparatuses described herein, a video containing hundreds of frames of images may be used to create an animation containing only a few keyframes and information for interpolating between the keyframes. When the animation is received in a playback system, such as a desktop computer with animation playback capability, the playback system can use the keyframes and interpolation information provided in the animation to synthesize and display images as the animation is being received. Thus, it is an intended advantage of embodiments disclosed herein to automatically create an animation based on a video, the animation being more compact than the video so that the animation may be concurrently received and displayed by a playback system which does not have the bandwidth to concurrently receive and display the video. It is a further intended advantage of embodiments disclosed herein to cross-link an animation with a video to allow a user to switch between viewing the animation and viewing the video during playback. It is a further intended advantage of embodiments disclosed herein to provide animations that have selectable temporal and spatial resolution and to provide a server system to select and deliver to a playback system an animation that has a temporal and spatial resolution that is appropriate to characteristics of the playback system.

These and other intended advantages are described below.

Terminology

Herein, the term "video" refers to a sequence of images that have been captured by a camera at a predetermined rate or generated by an image generator for playback at a predetermined rate. Each image in the sequence of images is included in a frame in the video and the real-world subject matter represented in the image is referred to as a scene. Video data is often stored such that for each frame there is data representing the image in the frame. This data may be in a compressed form or may be an uncompressed bit map. Any capture rate may theoretically be used, but the capture rate is usually fast enough to capture human-perceivable motions in a scene (e.g., 10 frames per second or greater).

A video may be provided from any source including, but not limited to, film, NTSC video (National Television Standard Code) or any other live or recorded video format. A video may be displayed on a number of different types of displays, including, but not limited to, cathode-ray tube displays (CRTs), liquid crystal displays, plasma displays and so forth.

The term "animation", as used herein, refers to a data construct that includes keyframes and information for interpolating between the keyframes. Keyframes are images that delineate, or that can be used to delineate, incremental transformations in a scene. In one embodiment, a new keyframe is provided for each incremental transformation in the scene and the criteria for determining what constitutes an incremental transformation can be adjusted according to system needs and user preferences. The more sensitive the criteria (i.e., smaller scene transformations), the more keyframes will be present in the animation.

According to one embodiment, two types of keyframes may be present in an animation: background frames and object frames. Background frames are keyframes that result from background motions or color changes. Background motions are usually caused by changes in the disposition of a camera used to record the scene. Typical changes in camera disposition include, but are not limited to, translation, rotation, panning, tilting or zooming of the camera. Color changes often result from changes in scene lighting (which may also result from a dispositional change in the camera such as a change in aperture), but may also be caused by color changes of large regions within the scene.

Object frames are keyframes that result from motions or color changes of objects within a scene and not from changes in disposition of the camera used to record the scene. Objects in a scene which move or change color independently of camera motions are referred to herein as dynamic objects. It will be appreciated that whether a given object is a dynamic object or part of the background of a scene depends in part on how large the object is relative to the rest of the scene. When an object becomes large enough (e.g., because it is physically or optically near the camera), the dynamic object effectively becomes the background of the scene.

According to embodiments disclosed herein, a sequence of background frames and information for interpolating between the background frames is stored in a data structure called a background track. Similarly, a sequence of object frames and information for interpolating between the object frames is stored in a data structure called an object track. An animation created using methods and apparatuses disclosed herein includes at least one background track and zero or more object tracks. The background track and object tracks are stored in a data structure called an animation object. An animation may be manifested in either an animation object for storage in a memory or in an animation data stream for transmission from point to point in a communication network or between subsystems in a device.

Creation and Delivery of Animations

FIG. 1 illustrates creation of an animation 14 and delivery of the animation 14 to a playback system 18. The animation is created by an animation authoring system 12 using a video source 10. Either after or during creation, the animation 14 is converted to an animation data stream 15 and delivered via a communication network 20 to a playback system 18. Alternately, the animation 14 may be delivered to the playback system 18 on distributable storage media 21 that can be read by a subsystem in playback system 18 to display the animation. Examples of distributable storage media include, but are not limited to, magnetic tape, magnetic disk, compact disk read-only-memory (CD ROM), digital video diskette (DVD) and so forth. The playback system 18 may be a device that is specially designed for animation playback (e.g., a DVD or cassette player) or a general purpose computer system that has been programmed to obtain the animation 14 (e.g., via a communication network or distributable media) and to execute animation playback software to display the animation 14. For example, a web browsing application program may be executed on any number of different types of computers to realize an animation playback system (e.g., Apple Macintosh computers, IBM compatible personal computers, workstations, and so forth). Program code for playing back the animation 14 may be included in the web browsing application itself or in an extension to the web browsing application that is loaded into the computer's operating memory when the web browsing application determines that an animation data stream 15 is to be received.

As indicated by dashed arrow 19 and dashed transmission path 17, a server system 16 may be used to control delivery of animations to playback systems on the network 20. For example, the server system 16 may be used to give priority to animation download requests from playback systems that belong to certain classes of subscribers, or to restrict access to a menu of available animations based on a service arrangement or other criteria. As a more specific example, consider a World Wide Web site (i.e., server computer) that is used to provide instructional animations for home improvement projects (e.g., laying tile, hanging a door, installing a ceiling fan and so forth). The site provider may wish to make at least one animation freely available to allow interested visitors to learn the usefulness of the service. Other animations may be made available for download on a pay-per-view basis. The site provider may also sell subscriptions to the site so that subscribers are given full download access to all animations in return for periodic payments. The server system 16 may be used to distinguish between download requests from these different classes of requesters and respond accordingly.

Another use of the server system 16 is to provide the animation 14 to the playback system 18 in one of a variety of different animation formats. The particular format used may be determined based on transmission network bandwidth and playback system capabilities. For example, a given playback system 18 may require the animation 14 to be described in a particular format or language that the playback system 18 can understand (e.g., Java, dynamic hypertext markup language (D-HTML), virtual reality modeling language (VRML), Macromedia Flash format and so forth). Also, background and object frames in the animation 14 may need to be sent at a particular spatial and temporal resolution to avoid exceeding the bandwidth of the transmission network, which is usually limited by the download rate (e.g., modem speed) of the playback system 18. In one embodiment, to accommodate the many possible permutations of animation languages and network bandwidths, the animation 14 is stored in a language and bandwidth independent format. The server system 16 can then be used to dynamically create an animation data stream according to the format and bandwidth requirements of the playback system 18. This operation of the server system is described in greater detail below.

Still referring to FIG. 1, the playback system 18 may obtain an animation data stream either from the communication network 20 or by reading an animation object stored in a locally accessible storage medium (e.g., DVD, CD ROM, cassette tape and so forth). In one embodiment, the playback system 18 is a time-based controller which includes play, pause, forward, rewind and step functions. In another embodiment, the playback system 18 may be switched between animation and video playback modes to render either animations or videos onto a display. The playback system 18 may also include an interactive, non-time-based playback mode to allow a user to click on hot spots within an animation, pan and zoom within animation frames or download animation still frames. Additional embodiments of the playback system are described below.

Animation Authoring System

Figure 2:
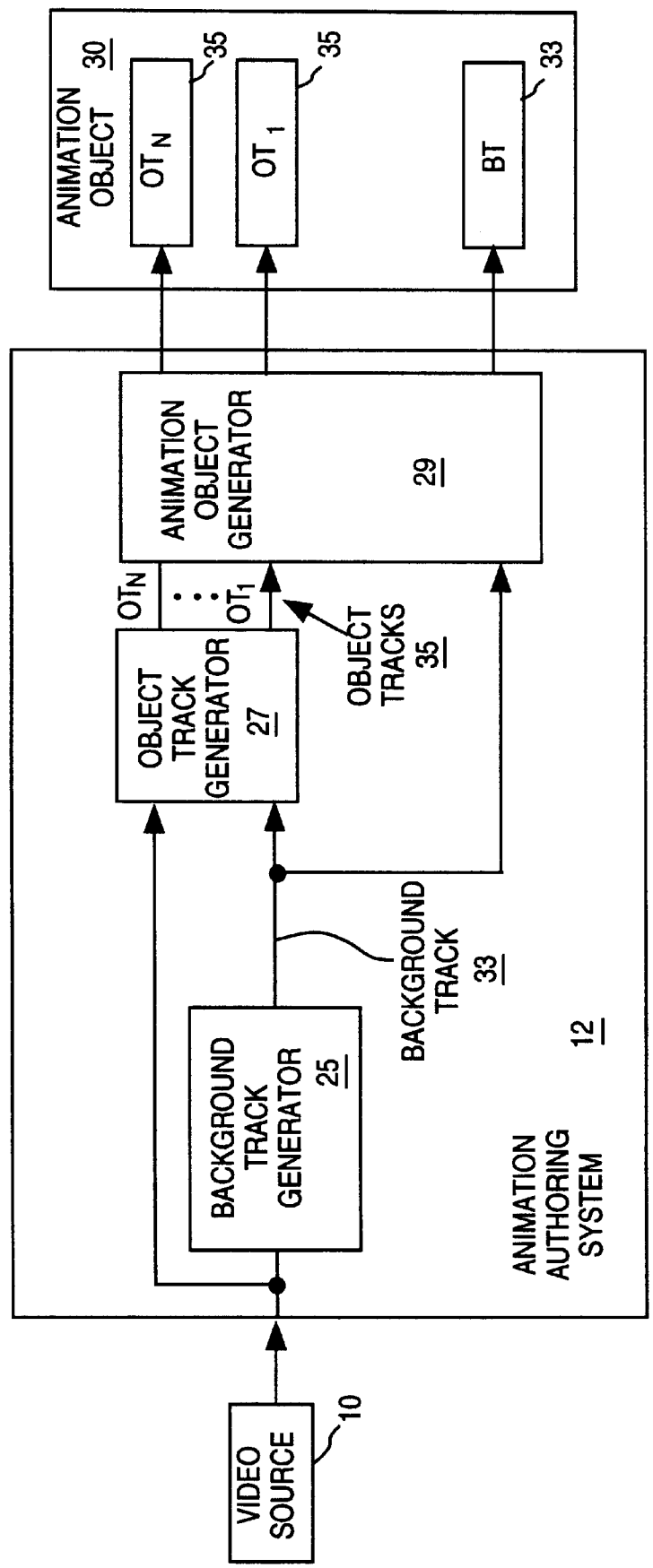
FIG. 2 is a block diagram of an animation authoring system according to one embodiment.

FIG. 2 is a block diagram of an animation authoring system 12 according to one embodiment. The animation authoring system 12 includes a background track generator 25, an object track generator 27 and an animation object generator 29. The video source 10 is initially received in the background track generator 25 which analyzes the sequence of frames in the video source 10 to generate a background track 33. The background track 33 includes a sequence of background frames and information that can be used to interpolate between the background frames. In one embodiment, the background track generator 25 outputs the background track 33 to the object track generator 27 and to the animation object generator 29 after the background track is completed. In an alternate embodiment, the background track generator 25 outputs the background track 33 to the object track generator 27 and to the animation object generator 29 as each new background frame within the background track 33 is completed.

As shown in FIG. 2, the object track generator 27 receives both the background track 33 from the background track generator 25 and the video source 10. The object track generator 27 generates zero or more object tracks 35 based on the background track 33 and the video source 10 and forwards the object tracks 35 to the animation object generator 29. Each object track 35 includes a sequence of object frames and transformation information that can be used to interpolate between the object frames.

The animation object generator 29 receives the background track 33 from the background track generator 25 and the zero or more object tracks 35 from the object track generator 27 and writes the tracks to an animation object 30. As discussed below, the animation object 30 may be formatted to include multiple temporal and spatial resolutions of the background track and object tracks.

Figure 3:
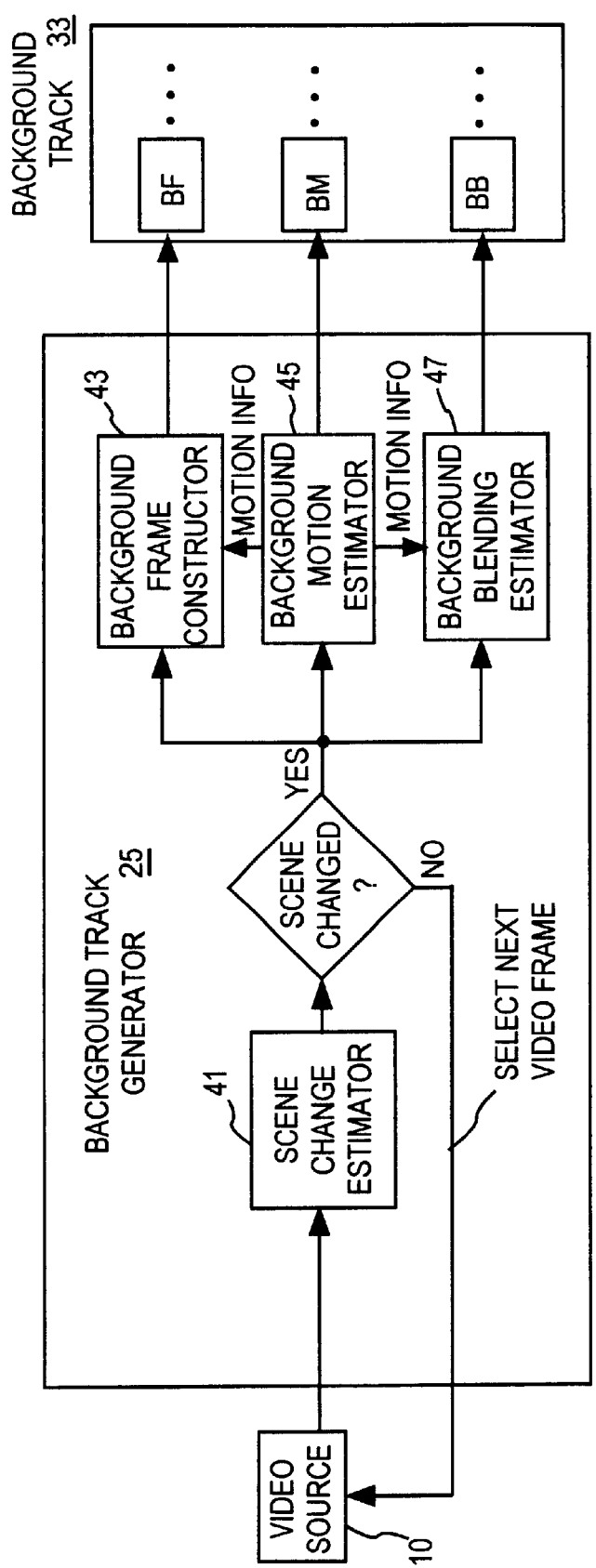
FIG. 3 is a block diagram of a background track generator according to one embodiment.

FIG. 3 is a block diagram of a background track generator 25 according to one embodiment. The background track generator 25 includes a scene change estimator 41, a background frame constructor 43, a background motion estimator 45 and a background blending estimator 47.

The scene change estimator 41 compares successive frames of the video source 10 to one another to determine when a transformation of a scene in the video frames exceeds a threshold. When applied to an entire video source 10, the effect of the scene change estimator 41 is to segment the sequence of frames in the video source 10 into one or more subsequences of video frames (i.e., video segments), each of which exhibits a scene transformation that is less than a predetermined threshold. Each video segment can be processed by The background motion estimator 45, background frame constructor 43 and background blending estimator 47 process each video segment identified by the scene change estimator 41 to generate a background frame and interpolation information for the video segment. Thus, the predetermined threshold applied by the scene change estimator 41 defines the incremental transformation of a scene which results in construction of a new background frame. In one embodiment, background frames correspond approximately to the start and end of each video segment and the background frame that corresponds to the end of one video segment corresponds to the beginning of the next video segment. Consequently, each video segment is delineated by background frames and, except for the first video segment (for which a starting and ending background frame is constructed), one background frame is constructed for each video segment in the video source 10.

FIG. 4A illustrates a video segment 54 that has been identified by the scene change estimator 41 of FIG. 3. According to one embodiment, the scene change estimator 41 operates by determining a transformation vector for each pair of adjacent video frames in the video segment 54. Herein, a first frame is considered to be adjacent a second frame if the first frame immediately precedes or succeeds the second frame in a temporal sequence of frames.

The transformation vector for each pair of adjacent video frames is represented in FIG. 4A by a respective delta (i.e., the "Δ" symbol). According to one embodiment, the transformation vector includes a plurality of scalar components that each indicate a measure of change in the scene from one video frame to the next in video segment 54. For example, the scalar components of a transformation vector may include measures of the following changes in the scene: translation, scaling, rotation, panning, tilting, skew, color changes and time elapsed.

According to one embodiment, the scene change estimator 41 applies a spatial low pass filter to the video segment 54 to increase the blockiness of the images in video segment 54 before computing the transformation deltas between adjacent frames. After being low pass filtered, the individual 15 images in the video segment 54 contain less information than before filtering so that less computations are required to determine the transformation deltas. In one implementation, the transformation delta computed for each pair of adjacent frames in the video segment 54 is added to transformation deltas computed for preceding pairs of adjacent frames to accumulate a sum of transformation deltas. In effect, the sum of transformation deltas represents a transformation between the first video frame 54A in the video segment 54 and the most recently compared video frame in the video segment 54. In one embodiment, the sum of transformation deltas is compared against a predetermined transformation threshold to determine if the most recently compared video frame has caused the transformation threshold to be exceeded. It will be appreciated that the transformation threshold may be a vector quantity that includes multiple scalar thresholds, including thresholds for color changes, translation, scaling, rotation, panning, tilting, skew of the scene and time elapsed. In an alternate embodiment, the transformation threshold is dynamically adjusted in order to achieve a desired ratio of video segments to frames in the video source 10. In another alternate embodiment, the transformation threshold is dynamically adjusted in order to achieve a desired average video segment size (i.e., a desired number of video frames per video segment). In yet another alternate embodiment, a transformation threshold is dynamically adjusted to achieve a desired average elapsed time per video segment. Generally, any technique for dynamically adjusting the transformation threshold may be used without departing from the spirit and scope of the present invention.

In one embodiment, if the most recently compared video frame 54C has caused the transformation threshold to be exceeded, the scene is deemed to have changed and the video frame 54B that precedes the most recently compared video frame 54C is indicated to be the ending frame of the video segment 54. Consequently, if a predetermined transformation threshold is used, each video segment of the video source 10 is assured to have an overall transformation that is less than the transformation threshold. If a variable transformation threshold is used, considerable variance in the overall transformation delta of respective video segments may result and it may be necessary to iteratively apply the scene change estimator to reduce the variance in the transformation deltas.

According to the embodiment depicted in FIG. 3, the background track generator 25 invokes the background motion estimator 45, background frame constructor 43 and background blending estimator 47 as each new video segment is defined (i.e., as each new scene change is detected). In an alternate embodiment, the scene change estimator 41 is used to completely resolve the video into subsequences before any of the subsequences are processed by the background frame constructor 43, background motion estimator 45 or background blending estimator 47.

As indicated in FIG. 4A and described above, video frames within a given video segment continue to be selected and compared until an accumulation of transformation deltas exceeds a transformation threshold. In one embodiment, when the last frame of a video is reached, the last frame is automatically considered to end a video segment. Also, after each new video segment is processed by the background frame constructor 43, the sum of transformation deltas is cleared. In an embodiment in which the entire video is parsed by the scene change estimator 41 before any of the video segments are processed, the transformation deltas associated with each video segment are recorded for later use by the background motion estimator 45 and the background frame constructor 43.

FIG. 4B is a flow diagram 57 that describes the operations of the background motion estimator 45, background frame constructor 43 and background blending estimator 47 depicted in FIG. 3. Starting at block 59, the background motion estimator inspects the video segment 54 indicated by the scene change estimator (i.e., the subsequence of video frames 54 bounded by BFi and BFi+1 in FIG. 4A) to identify a dominant motion of the scene depicted in those frames. This dominant motion is considered to be a background motion.

There are a number of techniques that may be used to identify the background motion in a video segment. One technique, called feature tracking, involves identifying features in the video frames (e.g., using edge detection techniques) and tracking the motion of the features from one video frame to the next. Features that exhibit statistically aberrant motion relative to other features are considered to be dynamic objects and are temporarily disregarded. Motions that are shared by a large number of features (or by large features) are typically caused by changes in the disposition of the camera used to record the video and are considered to be background motions.

Another technique for identifying background motion in a video segment is to correlate the frames of the video segment to one another based on common regions and then determine the frame to frame offset of those regions. The frame to frame offset can then be used to determine a background motion for the video segment.

Still other contemplated techniques for identifying background motion in a video segment include, but are not limited to, coarse-to-fine search methods that use spatially hierarchical decompositions of frames in the video segment; measurements of changes in video frame histogram characteristics over time to identify scene changes; filtering to accentuate features in the video segment that can be used for motion identification; optical flow measurement and analysis; pixel format conversion to alternate color representations (including grayscale) to achieve greater processing speed, greater reliability or both; and robust estimation techniques, such as M-estimation, that eliminate elements of the video frames that do not conform to an estimated dominant motion.

Still referring to the flow diagram 57 of FIG. 4B, the background frame constructor receives the background motion information from the background motion estimator in block 61 and uses the background motion information to register the frames of the video segment relative to one another. Registration refers to correlating video frames in a manner that accounts for changes caused by background motion. By registering the video based on background motion information, regions of the frames that exhibit motions that are different from the background motion (i.e., dynamic objects) will appear in a fixed location in only a small number of the registered video frames. That is, the regions move from frame to frame relative to a static background. These regions are dynamic objects. In block 63, the background frame constructor removes dynamic objects from the video segment to produce a processed sequence of video frames. At block 65, the background frame constructor generates a background frame based on the processed sequence of video frames and the background motion information. Depending on the nature of the transformation, construction of the background frame may involve compositing two or more processed video frames into a single background image or selecting one of the processed video frames to be the background frame. In one embodiment, the composite background frame may be a panoramic image or a high resolution still image. A panoramic image is created by stitching two or more processed video frames together and can be used to represent a background scene that has been captured by panning, tilting or translating a camera. A high resolution still image is appropriate when the subject of a processed sequence of video frames is a relatively static background scene (i.e., the disposition of the camera used to record the video source is not significantly changed). One technique for creating high resolution still images is to analyze the processed sequence of video frames to identify sub-pixel motions between the frames. Sub-pixel motion is caused by slight motions of the camera and can be used to create a composite image that has higher resolution than any of the individual frames captured by the camera. As discussed below, high resolution still images are particularly useful because they can be displayed to provide detail that is not present in the video source 10. Also, when high resolution still images of the same subject are constructed, the high resolution still images can be composited to form a still image having regions of varying resolution. Such an image is referred to herein as a multiple-resolution still image. As discussed below, a user can pause animation playback to zoom in and out on different regions of such a still image. Similarly, a user can pause animation playback to pan about a panoramic image. Combinations of pan and zoom are also possible. Further, an animation may be cross-linked with its video source so that, during playback of the video source, a user can be prompted to pause video playback to view a high resolution still, a panorama or a zoomable still image. Cross-linking is discussed in greater detail below.

Figure 5:
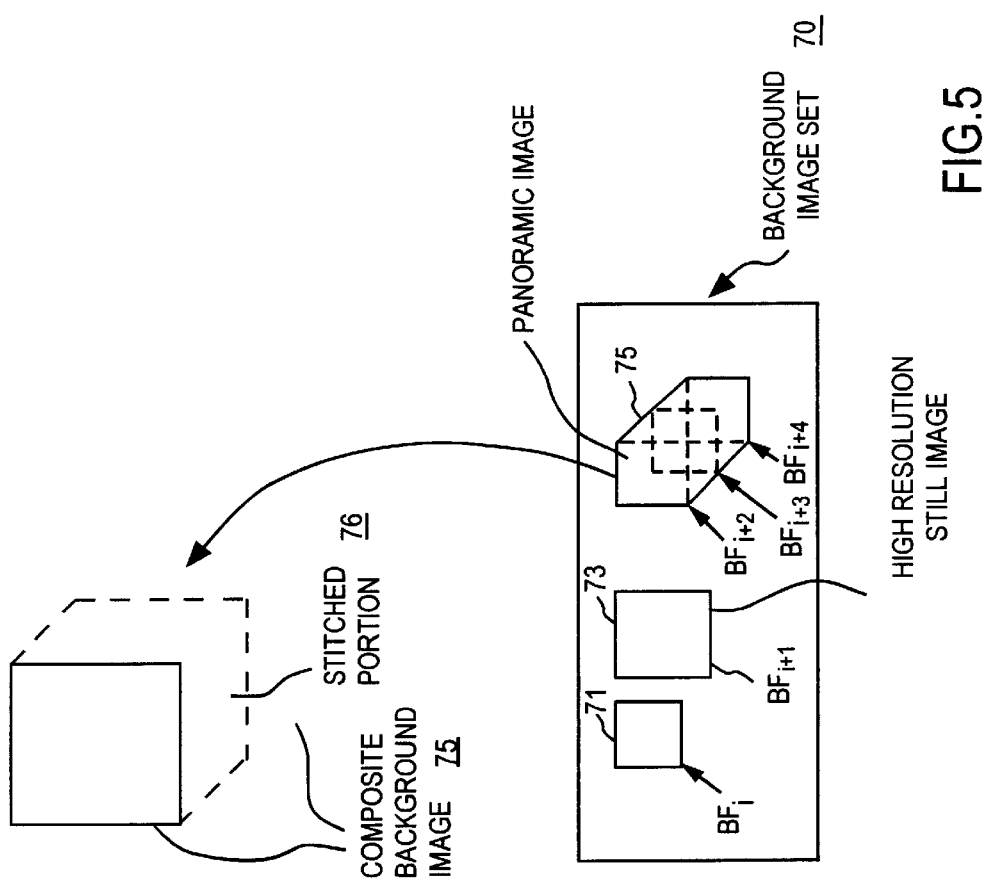
FIG. 5 illustrates a background image set that has been generated by the background frame constructor depicted in FIG. 3.

FIG. 5 illustrates a background image set 70 that has been generated by the background frame constructor 43 depicted in FIG. 3. Background frame $BF_i$ refers to a background image 71 that is a processed video frame, and not a composite image. This type of background image typically results from scaling (i.e., zoom in or out) or abrupt cuts between successive video frames. Background frame $BF_{i+1}$ refers to a high resolution still image 73 that has been composited from multiple processed video frames of essentially the same scene. As discussed above, this type of image is particularly useful for providing detail not perceivable in the video source. Background frames $BF_{i+2}$, $BF_{i+3}$ and $BF_{i+4}$ each refer to a different region of a panoramic background image 75. As indicated, the panoramic image frame 75 has been generated by stitching a portion 76 of one or more processed video frames onto another processed video frame. In this example, the camera may have been translated down and to the right, or panned right and tilted downward to incrementally capture more of the scene. Other shapes of composite background images may result from different types of camera motions.

Return to the final block in flow diagram 57 of FIG. 4B, the background blending estimator (e.g., element 47 of FIG. 3) generates background blending information based on the background motion information and the newly constructed background frame at block 67. Operation of the blending estimator is discussed in greater detail below.

Figure 6:
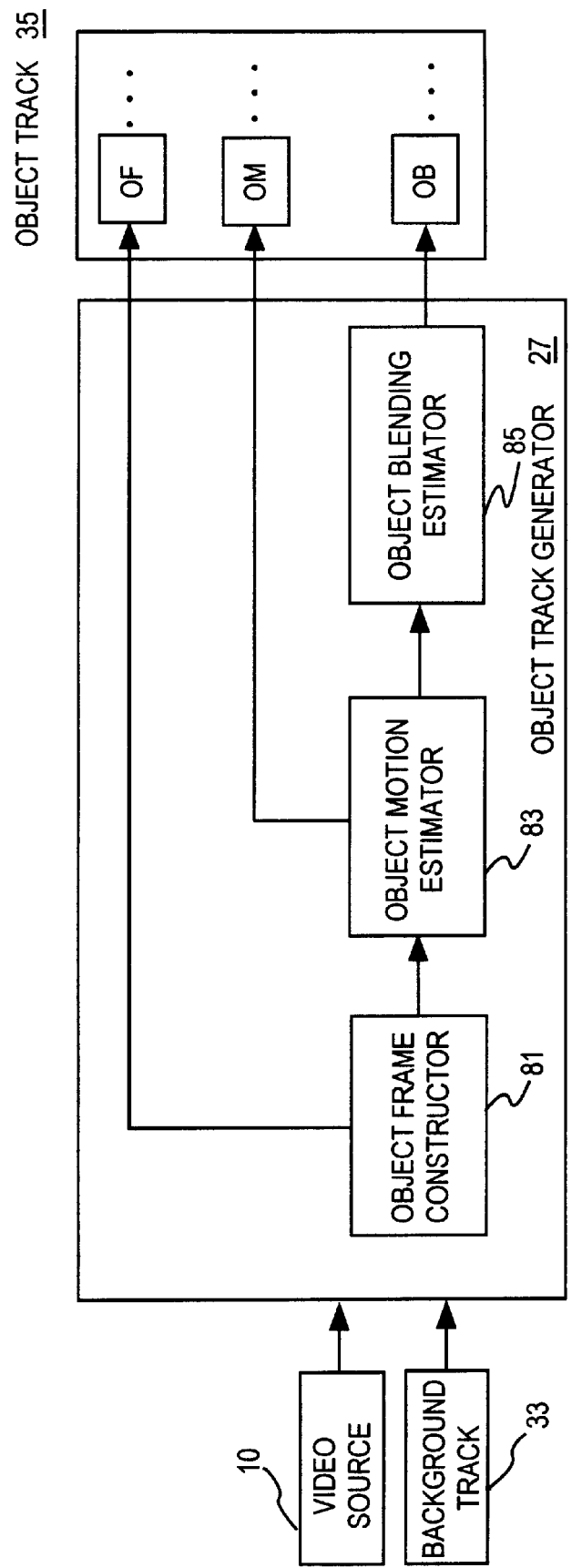
FIG. 6 is a block diagram of an object track generator according to one embodiment.

FIG. 6 is a block diagram of an object track generator 27 according to one embodiment. The object track generator 27 receives a background track 33 generated by the background track generator (e.g., element 25 of FIG. 2) and the video source 10 as inputs. The object track generator 27 identifies dynamic objects in the scene based on differences between the background track 33 and the video source 10, and records object frames (OF) containing the dynamic objects along with object motion (OM) and object blending (OB) information in an object track 35.

In one embodiment, the object track generator 27 includes an object frame constructor 81, an object motion estimator 83 and an object blending estimator 85. The object frame constructor 81 compares video frames in the video source 10 against background frames in the background track 33 to construct the object frames (OF). As discussed below, each object frame constructed by the object frame constructor 81 contains a dynamic object. In one embodiment, at least one object frame is generated per dynamic object detected in a given video segment (i.e., per dynamic object detected in a subsequence of video frames identified by the scene change estimator 41 of FIG. 3). The object motion estimator 83 tracks the motion of dynamic objects in a video segment to generate the object motion information (OM), and the object blending estimator 85 generates the object blending information (OB) based on the object frames and the object motion information generated by the object frame constructor 81 and the object motion estimator 83, respectively.

Figures 7A, 7B:
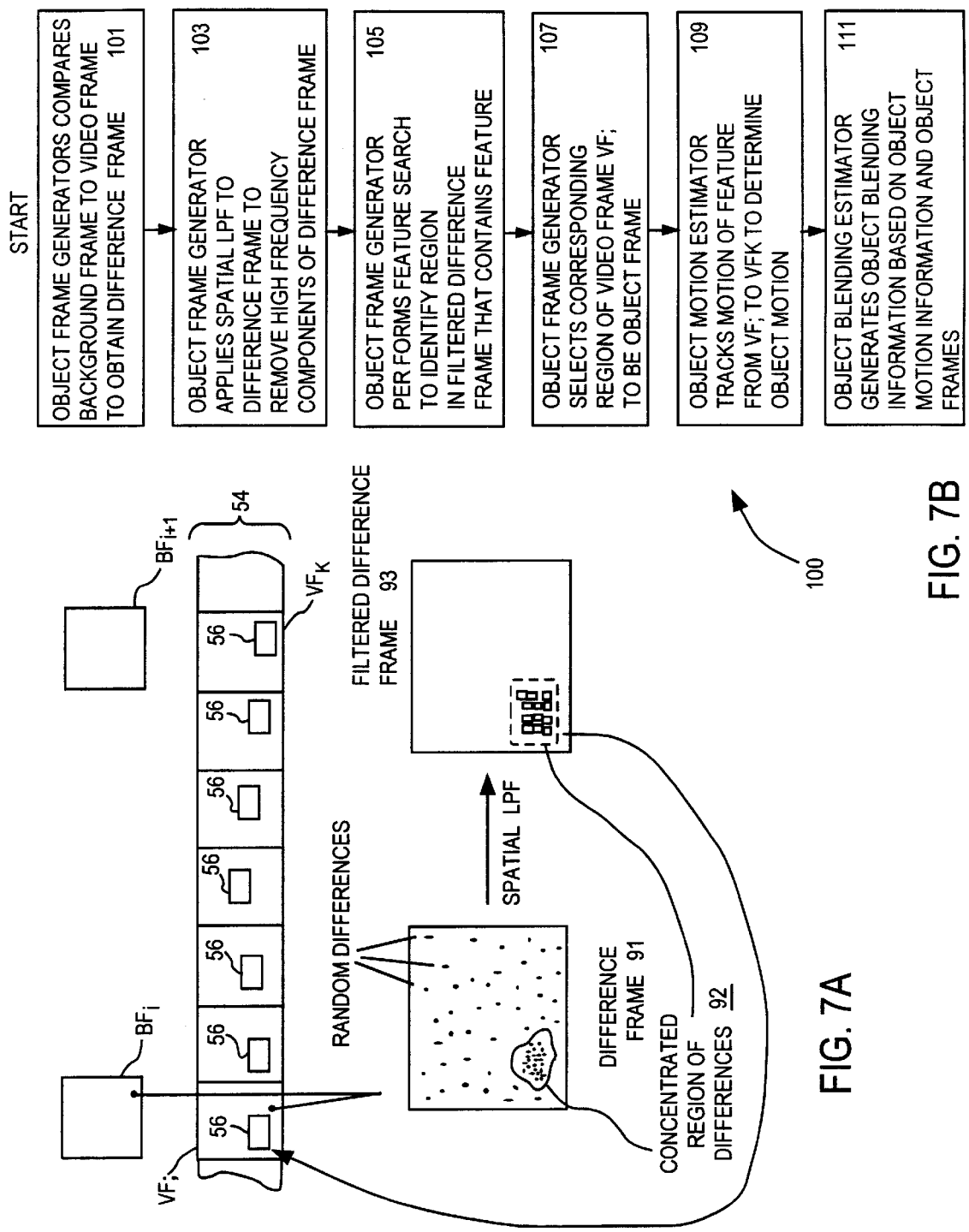
FIG. 7A depicts a video segment that has been identified by the scene change estimator 41 of FIG. 3.
FIG. 7B is a flow diagram 100 of the operation of an object track generator according to one embodiment.

FIG. 7A and FIG. 7B illustrate the operation of the object track generator 27 of FIG. 6 in greater detail. FIG. 7A depicts a video segment 54 that has been identified by the scene change estimator 41 of FIG. 3. The video segment 54 is bounded by background frames $BF_i$ and $BF_{i+1}$ and contains a dynamic object 56. FIG. 7B is a flow diagram 100 of the operation of the object track generator 27.

Starting at block 101 of the flow diagram 100, the object frame constructor (e.g., element 81 of FIG. 6) compares background frame BFi to video frame $VF_j$ of the video segment 54 to generate a difference frame 91. As indicated in FIG. 7A, small differences between the $BF_i$ and $VF_j$ produce somewhat random differences (noise) in the difference frame 91. However, a relatively concentrated region of differences 92 between $BF_i$ and $VF_j$ occurs where a dynamic object has been removed from the background frame $BF_i$ by the background frame constructor (e.g., element 43 of FIG. 3). At block 103 of the flow diagram 100, a spatial low pass filter is applied to the difference frame 91 to produce a filtered difference frame 93. In the filtered difference frame 93, the random differences (i.e., high frequency components) have disappeared and the concentrated region of differences 92 exhibits increased blockiness. As a result, the contours of the concentrated region of differences 92 can be more easily discerned. Accordingly, at block 105 of the flow diagram 100, the object frame constructor performs a feature search (e.g., using edge detection techniques) to identify the concentrated region of differences 92 in the filtered difference frame 93. At block 107, the object frame constructor selects a region within video frame $VF_j$ that corresponds to the concentrated region of differences 92 in filtered difference frame 93 to be an object frame 56. In one embodiment, the object frame constructor selects object frame 56 to be a rectangular region that corresponds (e.g., has similar x, y offsets) to a rectangular region of the filtered difference frame 93 which encompasses the concentrated region of differences 92. Alternate object frame shapes may be used. It will be appreciated that if there are no concentrated regions of differences in the filtered difference frame 93, no object frames will be selected by the object frame constructor. Conversely, multiple object frames may be selected if there are multiple concentrated regions of differences in the filtered difference frame 93. Each concentrated region of differences in the filtered difference frame 93 is considered to correspond to a dynamic object in the subsequence of video frames 54.

After a dynamic object has been identified and framed in an object frame 56 by the object frame constructor, the motion of the dynamic object is determined by tracking positional changes in the object frame 56 through the frame progression in video segment 54. Thus, at block 109 of the flow diagram 100, the object motion estimator (e.g., element 83 of FIG. 6) tracks the motion of the dynamic object identified and framed by the object frame constructor from one video frame to the next in the video segment 54. According to one embodiment, object motion tracking is performed by feature searching within each successive video frame of the video segment 54 to determine the new position of the dynamic object of interest. Using the frame to frame motion of the dynamic object, the motion estimator generates motion information that can be used to interpolate between successive object frames to approximate the motion of the dynamic object. At block 111 of the flow diagram 100, the object blending estimator (e.g., element 85 of FIG. 6) generates object blending information based on the object motion information and the object frames. In one embodiment, the operation of the object blending estimator is the same as the operation of the background blending estimator. However, alternative techniques for generating information for blending successive object frames may be used without departing from the spirit and scope of the present invention.

As mentioned above, in one embodiment of the object track generator 27 of FIG. 3, at least one object frame is generated for each dynamic object identified within a video segment by the object frame constructor 81. If the object motion estimator 83 determines that a motion of a dynamic object in a video segment is too complex to be adequately represented by interpolating between object frames that bound the video segment, the object motion estimator 83 may indicate the need for construction of one or more additional object frames for the video segment. Using the techniques described above, the object frame constructor will then generate the additional object frames at the juncture within the video segment indicated by the object motion estimator. As discussed above in reference to background frame construction, object frames may include image data drawn from a region of a composite image. If one or more additional object frames are constructed to represent a dynamic object that is undergoing a complex motion, the additional frames may be organized in the animation object to cause the dynamic object to overlay other features in a scene during animation playback.

Dynamic objects occasionally eclipse one another in a scene. According to one embodiment of the object track generator 27, when dynamic objects that are represented by separate object tracks eclipse one another, the object track for the eclipsed dynamic object is ended and a new object track is generated if the eclipsed object re-emerges. Consequently, if dynamic objects repeatedly eclipse one another, a large number of discrete object tracks may be produced. In an alternate embodiment of the object track generator, information may be associated with object tracks to indicate which of two dynamic objects is to displayed on top of the other if their screen positions should converge.

As with background images, images of dynamic objects (i.e., object images) may be composited from a plurality of video frames. Composite object images include, but are not limited to, panoramic object images, high resolution still object images, and multiple-resolution still object images. Generally, any compositing of images that can be used to produce a composite background image may also be used to produce a composite object image.

Figure 8:
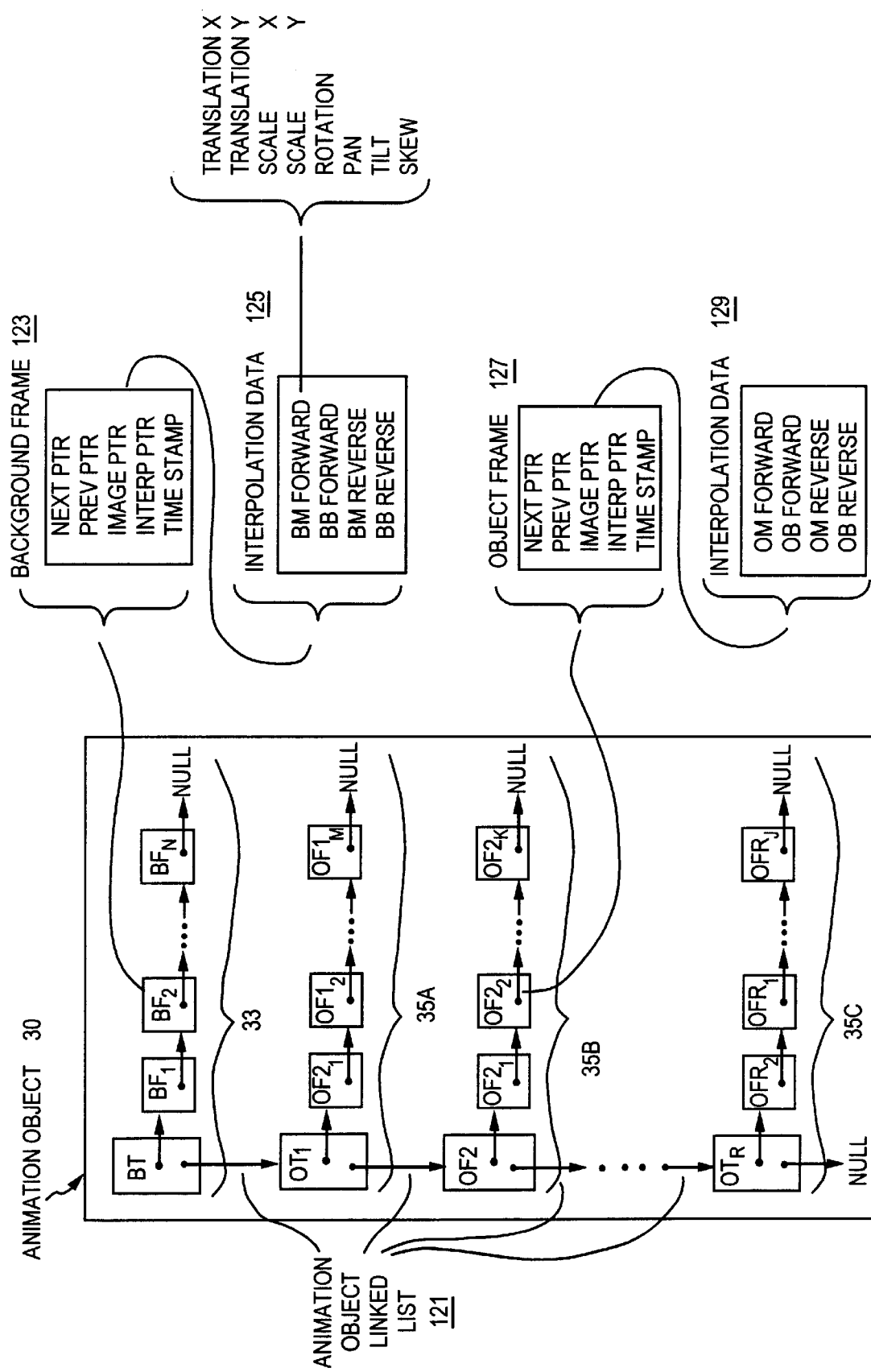
FIG. 8 is a diagram of an animation object according to one embodiment.

FIG. 8 is a diagram of an animation object 30 according to one embodiment. The animation object 30 includes a background track 33 and a plurality of object tracks 35A, 35B, 35C. As discussed above, the number of object tracks depends on the number of dynamic objects identified in the scenes depicted in the video source and, if no dynamic objects are identified, there may be no object tracks in the animation object 30.

In one embodiment, the animation object 30 is implemented by a linked list 121 of a background track and object tracks. The background track is itself implemented by a linked list of a background track element BT and a sequence of background frames $BF_1$–$BF_N$. Each of the object tracks are likewise implemented by a linked list of an object track element $OT_1$, $OT_2$, OTR and a respective sequence of object frames ($OF1_1$–$OF1_m$, $OF2_1$–$OF2_K$, $OFR_1$–$OFR_J$). In one embodiment, the background track element BT and the object track elements $OT_1$, $OT_2$, $OT_R$ also include pointers to implement the animation object linked list 121. That is, the background track element BT includes a pointer to the first object track element $OT_1$, the first object track element $OT_1$ includes a pointer to the next object track element $OT_2$, and so forth until object track $OT_R$ is reached. In one embodiment, the end of the animation object linked list 121 and the individual background and object track linked lists are indicated by respective null pointers in their final elements. Other techniques for indicating the end of the linked lists may be used in alternate embodiments. For example, the animation object 30 may include a data structure that includes a head pointer to point to the background track 33 and a tail pointer to point to the final object track 35C in the animation object linked list 121. Similarly, the background track element BT and each of the object track elements $OT_1$, $OT_2$, $OT_R$ may include respective tail pointers to indicate the ends of their respective linked lists. In yet another embodiment, flags in the elements of a linked list may be used to indicate the end of the list.

Still referring to FIG. 8, data structure 123 is used to implement a background frame according to one embodiment. The members of the background frame data structure 123 include a next pointer (NEXT PTR) to point to the next background frame in the background track 33, a previous pointer (PREV PTR) to point to the preceding background frame in the background track 33, an image pointer (IMAGE PTR) to point to the location of the image data for the background frame, an interpolation pointer (INTERP PTR) to point to an interpolation data structure and a timestamp (TIMESTAMP) to indicate a relative playback time for the background frame. As discussed below, the background frame data structure 123 may further include one or more members for cross-linking with frames of the video source.

Recalling that the image to be displayed for a given background frame may be obtained from either a non-composite or composite background image, the image pointer in background frame data structure 123 may itself be a data structure that indicates the location of the background image in a memory, the offset (e.g., row and column) within the background image from which to obtain the image data for the background frame and a pointer to the video segment used to generate the background frame. As described below, the pointer to the video segment is used to link an animation and a video source. In one implementation, the pointer to the video segment is a pointer to at least the first video frame in the video segment. Other techniques for linking the background frame to the video segment may be used without departing from the spirit and scope of the present invention.

In one embodiment, the background interpolation data structure 125 includes data for interpolating between a given background frame and its adjacent background frames. The information for interpolating between a background frame and its adjacent succeeding background frame (i.e., the next background frame) includes forward background motion information (BM FORWARD) and forward background blending information (BB FORWARD). Similarly, the information for interpolating between a background frame and its adjacent preceding background frame includes reverse background motion information (BM REVERSE) and reverse background blending information (BB REVERSE). The background motion information in a given direction (i.e., forward or reverse) may itself be a data structure that contains a number of members. In the exemplary embodiment depicted in FIG. 8, the forward background motion information (BM FORWARD) includes members which indicate translation of the background scene in the X and Y direction (i.e., horizontally and vertically in the image plane) to reach the next background frame, a scale factor in the X and Y direction (i.e., to indicate camera zoom in/out and changes in aspect ratio), a rotation factor, a pan factor, a tilt factor and a skew factor. It will be appreciated that more or fewer motion parameters may be used in alternate embodiments. Reverse background motion information (BM REVERSE) may be indicated by a similar set of motion parameters.

In one embodiment, each of the individual object frames are implemented by an object frame data structure 127 that is similar to the above described background frame data structure 123. For example, object frame data structure 127 includes a pointer to the next object frame in the object track (NEXT PTR), a pointer the previous object frame in the object track (PREV PTR), an image pointer (IMAGE PTR), an interpolation pointer (INTERP PTR) and a timestamp (TIMESTAMP), each of which performs a function similar to the functions of the same members within the background track data structure 123. Of course, the image pointer in the object frame data structure 127 indicates object image data instead of background image data and the interpolation pointer indicates object interpolation data instead of background interpolation data. As shown in FIG. 8, an exemplary object interpolation data structure includes members indicating both forward and reverse object motion (OM FORWARD and OM REVERSE, respectively) and both forward and reverse object blending information (OB FORWARD and OB REVERSE, respectively).

Figure 9B:
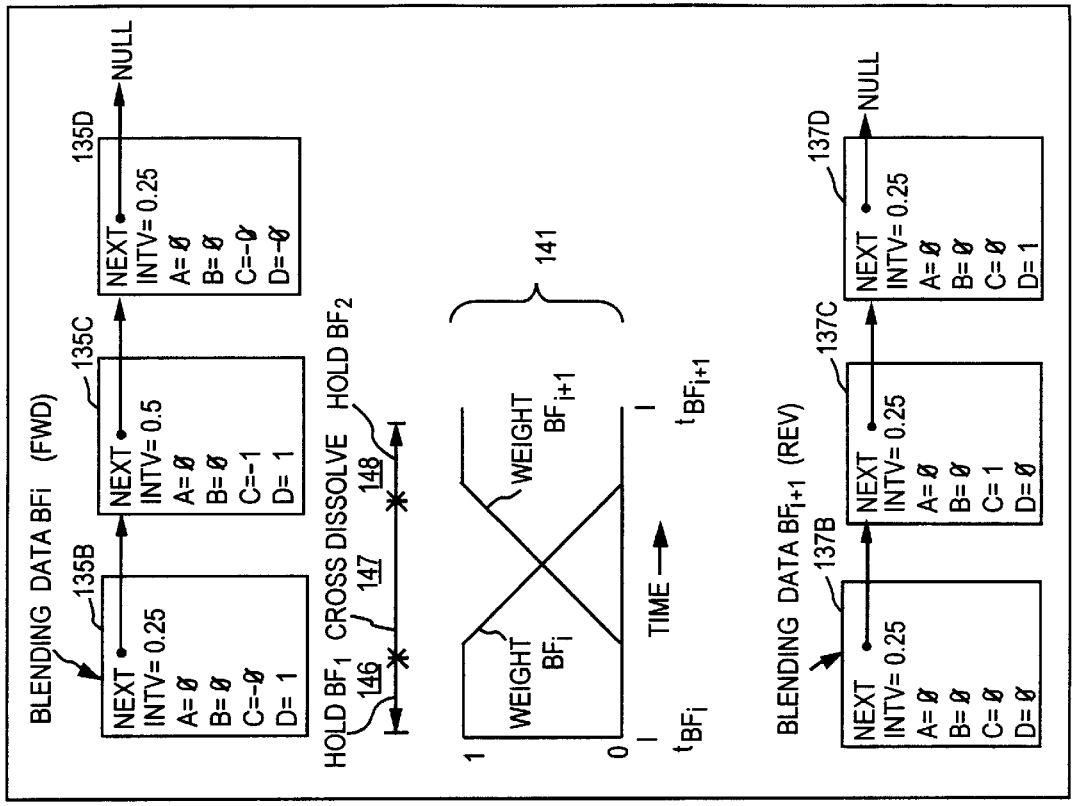
FIG. 9B illustrates a discontinuous blending function.
Figure 9A:
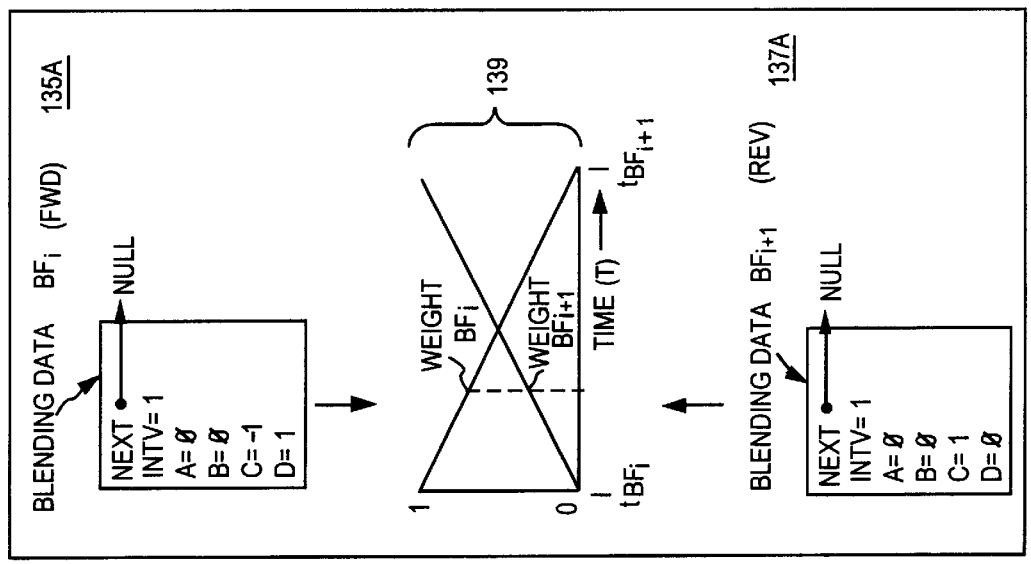
FIG. 9A illustrates exemplary embodiments of background frame blending data structures that can be used to perform background blending.

FIG. 9A illustrates exemplary embodiments of background frame blending data structures 135A, 137A that can be used to perform background blending. It will be appreciated that object blending data may be similarly organized. In one embodiment, each blending data structure 135A, 137A includes a blending operator in the form of coefficients of a polynomial expression (A, B, C, D), an interval fraction (INTV) which indicates the portion of an interval between two successive background frames over which the blending operator is to be applied and a pointer to a next blending structure to allow an interval between successive background frames to be represented by multiple blending operators.

In FIG. 9A, forward background blending data 135A for background frame BFi and reverse background blending data 137A for background frame $BF_{i+1}$ are depicted along with a graph 139 which illustrates the manner in which the blending data is applied to blend the background frames BFi and BFi+1. The blending operation depicted in the graph is known as a cross-dissolve operation because the background frame $BF_i$ is effectively dissolved into background frame $BF_{i+1}$ during the blending interval (i.e., the time between the background frames). To generate an interpolated frame at time 'INT, the background frame $BF_i$ is transformed in the forward direction based on the forward background motion information for frame $BF_i$ and the background frame $BF_{i+1}$ is transformed in the reverse direction based on the reverse background motion information for frame $BF_{i+1}$. Respective weights (i.e., multipliers) are calculated for frames $BF_i$ and $BF_{i+1}$ using the blending information for those frames. The weight for frame $BF_i$ is based on the forward blending information for background frame $BF_i$ and the weight for background frame $BF_{i+1}$ is based on the reverse blending information for frame BFi+1. The weights for frames $BF_i$ and $BF_{i+1}$ are then applied respectively to the transformed versions of background frames BFi and $BF_{i+1}$ and the resulting transformed, weighted images are combined (e.g., using pixel by pixel addition), to generate the interpolated frame.

As mentioned above, in one embodiment, the blending operator is implemented by storing the coefficients of a polynomial expression and the portion of the blending interval over which the polynomial expression is to be applied. For example, the forward blending data 135A for frame BFi includes an interval fraction of one (INTV=1), indicating that the blending operator indicated by coefficients A, B, C, D of blending data 135A is to be applied over the entire blending interval (in this case the interval between tBFi and tBFi+1). Generally, interval fractions of less than one are used where the overall blending function includes discontinuities that cannot be adequately represented by a limited order polynomial expression. In the blending operation depicted in graph 139, however, a continuous, first order blending operation is indicated. Thus, applying the coefficients A, B, C and D specified in blending data structure 135A to the polynomial expression weight(T)=$AT^3+BT^2+CT+D$ yields weight$BF_i$(T)=1−T. According to one embodiment, the value of T is normalized to range from 0 to 1 over the fraction of the blending interval in question so that the blending operator A=0, B=0, C=−1, D=1 yields a multiplier which decreases linearly with time throughout the blending interval. The multiplier for $BF_i$ starts at 1 and decreases linearly to 0 at the end of the blending interval. Referring to the blending operator for frame $BF_{i+1}$, applying the coefficients A=0, B=0, C=1, D=0 specified in blending data structure 137A yields the result $weight_{BFi+1}(T) = T$. Thus, the multiplier for frame $BF_{i+1}$ starts at 0 and increases linearly to 1 during the blending interval.

FIG. 9B illustrates a discontinuous blending function 141. In this case, the blending interval between background frames $BF_i$ and $BF_{i+1}$ is divided into three interval fractions 146, 147 and 148. During a first fraction 146 of the blending interval, the weight applied to background frame $BF_i$ is held steady at one and the weight applied to background frame $BF_{i+1}$ is held steady at zero. During a second fraction 147 of the blending interval, a linear cross-dissolve occurs and during a third fraction 148 of the blending interval, the multipliers of frames $BF_i$ and $BF_{i+1}$ are again held steady, but at values opposite those of the first fraction 146 of the blending interval. In one the discontinuous blending function 141 is indicated by a inked list of blending data structures 135B, 135C, 135D, with each blending data structure in the list indicating the fraction of the blending interval over which it is to be applied in its respective INTV parameter. Thus, a first forward blending data structure 135B for background frame BFi contains the interval fraction INTV=0.25, and a blending operator $weight_{BF_i}(T)=1$ indicating that a unity multiplier is to be applied to transformed versions of frame BFi over the first 25% of the blending interval (i.e., interval 146). A second blending data structure 135C for the background frame BFi contains the interval fraction INTV=0.5 and a blending operator $weight_{BF_i}(T)=1-T$, indicating that during the middle 50% of the blending interval (i.e., interval 147), the weight applied to the frame $BF_i$ is to be reduced linearly from 1 to 0. Note, for ease of explanation, the value of T is assumed to be normalized to range from 0 to 1 during each interval fraction. Other representations are of course possible and considered to be within the scope of the present invention. A third blending data structure 135D for the background frame BFi contains the interval fraction ITV=0.25 and a blending operator given by $weight_{BF_i}(T)=0$, indicating that for the last 25% of the blending interval (i.e., interval 148), frame $BF_i$ provides no contribution to the interpolated background frame.

Still referring to FIG. 9B, the linked list of blending data structures 137B, 137C, 137D for background frame $BF_{i+1}$ indicates an inverse blending function of that indicated for background frame $BF_i$. That is, during the first 25% of the blending interval, a weight of 0 is applied to transformed versions of frame $BF_{i+1}$ (indicating no contribution from frame $BF_{i+1}$ to the interpolated background frame during that time), during the middle 50% of the blending interval the weight applied to transformed versions of frame $BF_{i+1}$ is increased linearly from 0 to 1, and during the last 25% of the blending interval, a unity multiplier (i.e., weight=1) is to be applied to transformed versions of frame $BF_{i+1}$ to create interpolated background frames.

One reason for applying a discontinuous blending function of the type shown in FIG. 9B is to reduce the distortion associated with blending successive keyframes. By holding the contribution of a given keyframe steady for a fraction of a blending interval, distortion caused by differences between the forward and reverse transformations of frames $BF_i$ and $BF_{i+1}$ can be reduced. In one embodiment, operator input is received in the animation authoring system (e.g., element 12 of FIG. 1) to select a fraction of a blending interval over which to hold steady the contribution of a given keyframe. In an alternate embodiment, a measure of image sharpness (e.g., image gradients) can be determined for both blended and unblended images to automatically determine interval fractions over which contributions one or another image should be held steady. Also, while linear cross-dissolve operations are described above, other types of cross-dissolve operations may be defined by different polynomial expressions. Also, instead of using polynomial coefficients to indicate the type of blending operation, other indicators may be used. For example, a values indicating whether to apply a linear, quadratic, transcendental, logarithmic or other blending operation may be stored in the blending data structure. Although background blending has been described primarily in terms of cross-dissolve operations, other blending effects may also be used to transition from one background frame to another, including, but not limited to, fading and a variety of screen wipes.

Figure 10:
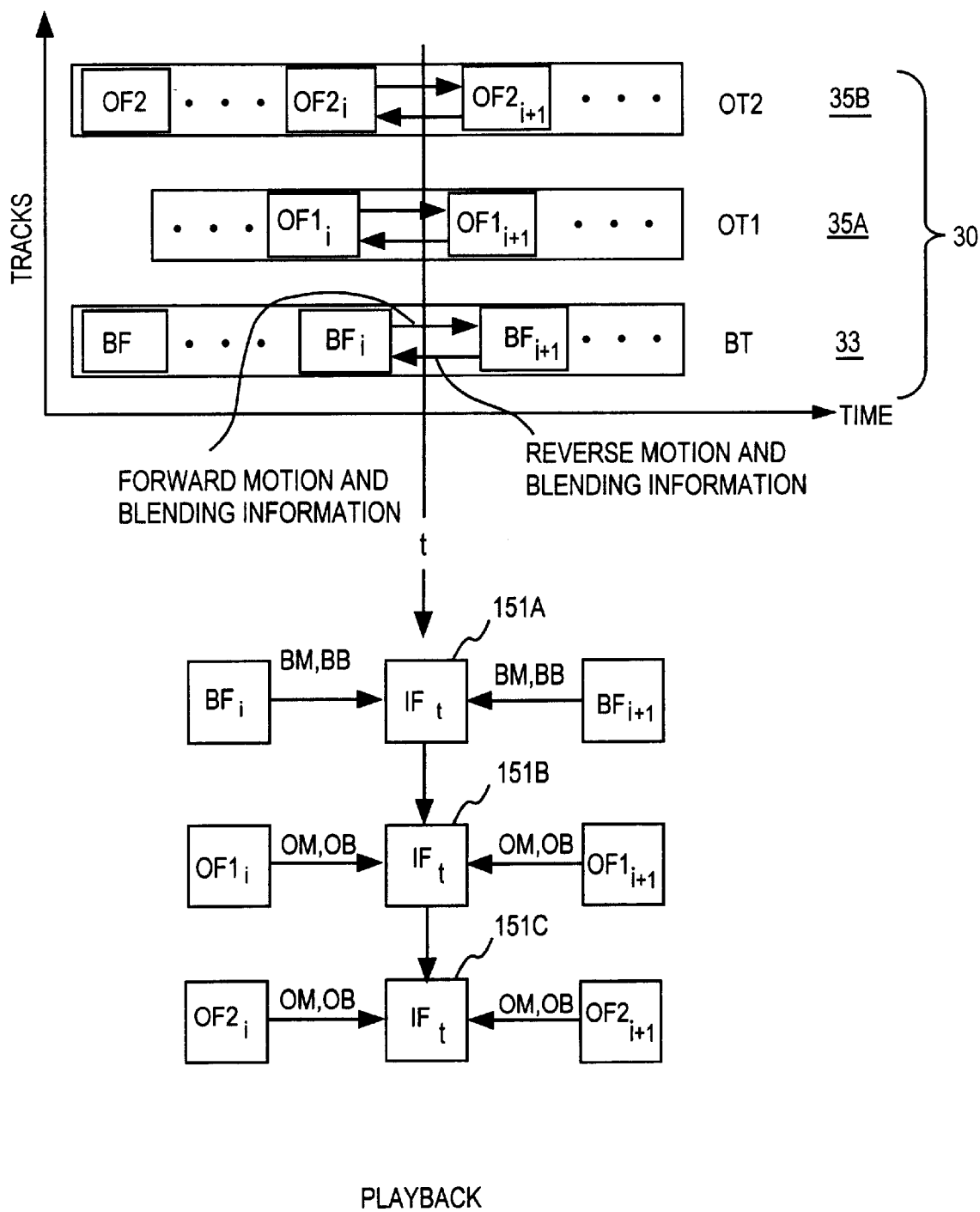
FIG. 10 illustrates the manner in which a background track and object tracks of an exemplary animation object may be used to synthesize an interpolated frame during animation playback.

FIG. 10 illustrates the manner in which a background track 33 and object tracks 35A, 35B of an exemplary animation object 30 may be used to synthesize an interpolated frame $IF_t$ during animation playback.

At a given time, t, the interpolation frame $IF_t$ is generated based on respective pairs of adjacent frames in the background track 33 and object tracks 35A, 35B. The pair of adjacent background frames $BF_i$, $BF_{i+1}$ are each transformed and weighted using the background motion and background blending information associated with those background frames. The background frame BFi is transformed according the forward background motion information (BM) associated with frame $BF_i$ and then weighted according to the forward background blending information (BB) associated with frame $BF_i$. The effect is to transform pixels in the background frame $BF_i$ to respective positions based on the forward motion information (e.g., translation, rotation, scaling, pan, tilt or skew) and then to decrease the intensity level of each of the pixel values by weighting the pixel values based on the blending operator. The pixels in the background frame $BF_{i+1}$ are likewise transformed and weighted by the reverse motion and blending information (BM, BB) for frame $BF_{i+1}$. The resulting transformed images are then combined to create an interpolated background frame 151A that represents the background scene at time t. Object frames $OF1_i$ and $OF1_{i+1}$ are likewise transformed using forward and reverse object motion information (OM), respectively, weighted using forward and reverse object blending information (OB), respectively, and then combined. The resulting interpolated object frame is then overlaid on the interpolated background frame 151A to produce an interpolated frame 151B that includes an interpolated background and an interpolated dynamic object. Object frames $OF2_i$ and $OF2_{i+1}$ are also transformed, weighted and combined using object motion and blending information associated with those object frames (OM, OB) and then overlaid on the interpolated background. The result is a completed interpolated frame 151C. Successive interpolated frames are likewise created, using different values of the time variant blending operator and progressive transformation of the background and object frames based on the motion information. The net effect of the animation playback is to produce video effects that approximate the original video used to create the animation object 30. A sound track obtained from the original video may also be played back with the animation.

FIG. 11 and FIG. 12 illustrate techniques for providing multiple resolutions of animations in an animation object.

FIG. 11 illustrates a technique for providing multiple temporal resolutions of animation keyframes and FIG. 12 illustrates a technique for providing multiple spatial resolutions of animation keyframes. In one embodiment, an animation object is structured to provide both types of multiple playback resolutions, spatial and temporal. This provides a playback system user with the option of increasing or decreasing the resolution of the animation sequence in either spatial or temporal dimensions or both. If the playback system has sufficient download bandwidth and processing power, then maximum temporal and spatial resolution may be selected to present a highest resolution animation playback. If the playback system does not have sufficient download bandwidth or processing power to handle maximum spatial and temporal resolution, then the playback system may automatically reduce either the spatial or temporal resolution of the animation being played back based on a user-selected criteria. For example, if the user has indicated a desire to view maximum spatial resolution images (i.e., larger, more resolute images), even if it means less keyframes and more interpolation frames, then a maximum or near maximum spatial resolution keyframe may be chosen for display while a keyframe track (i.e., a background track or object track) having fewer keyframes per unit time is selected. Conversely, if a user desires greater temporal resolution (i.e., more keyframes per unit time), even if spatial resolution must be reduced, then a maximum or near maximum temporal resolution keyframe track may be chosen, but with each keyframe being displayed with reduced spatial resolution.

Another contemplated use for reducing the temporal resolution of the animation is in rapid scanning, both forward and backward within the animation. During animation playback, a user can signal a temporal multiplier (e.g.,2×, 5×, 10× and so forth) in a request to view the animation at a faster rate. In one embodiment, the request for rapid scanning is satisfied by using the temporal multiplier together with the playback system's bandwidth capabilities to select an appropriate temporal resolution of the animation. At very fast playback rates, the spatial resolution of the animation can also be reduced. A temporal multiplier may similarly be used to slow animation playback to a slower than natural rate to achieve a slow motion effect.

FIG. 11 depicts a multi-temporal level background track 161. An object track may be arranged similarly. In a first level background track 35A, a maximum number of background frames (each labeled "BF") are provided along with background motion and blending information for interpolating between each successive pair of background frames. The number of background frames per unit time may range from a video frame rate (in which case the motion and blending information would indicate no information—just a cut to next frame) to a small fraction of the video frame rate. A second level background track 35B has fewer background frames than the first level background track 35A, a third level background track 35C has fewer background frames than the second level background track and so forth to an Nth level background track 35D. Although the number of background frames in the second level background track 35B is depicted in FIG. 11 as being half that of the level one background track 35A, other ratios may be used. The blending and motion information ($BM_2$, $BB_2$) for interpolating between each successive pair of background frames in the second level background track 35B is different from the blending and motion information ($BM_1$, $BB_1$) for the first level background track 35A because the transformation from background frame to background frame at the different level tracks is different. The third level background track 35c likewise has fewer background frames than the second level background track 35B and therefore different motion and blending information ($BM_3$, $BB_3$) from frame to frame. The ascending levels of background tracks are incrementally less temporally resolute until the least resolute background track at level N is reached.

In one embodiment, the background track levels above the first level 35A do not actually contain a separate sequence of background frames. Instead, pointers to background frames within the first level background track 35A are provided. For example, the first background frame 62B in the second level background track 35B may be indicated by a pointer to the first background frame 62A in the first level background track 62A, the second background frame 63B in the second level background track 35B may be indicated by a pointer to the third background frame 63A in the first level background track 35A and so forth. The respective pointers to background frames in the level one background track 35A may be combined in a data structure with motion and blending information that indicates transformation to the next background frame and with motion and blending information that indicates transformation to the previous background frame. Further, a linked list of such data structures may be used to indicate the sequence of background frames. Other data structures and techniques for indicating the sequence of background frames may be used without departing from the spirit and scope of the present invention.

In alternate embodiment, each of the background track levels 35A, 35B, 35C, 35D is formed by a number of reference values that select background frames from a set (or pool) of background frames. In this embodiment, the reference values used to form a background track of a given level effectively define a sequence of keyframes having a temporal resolution that is determined by the number of reference values. A reference value used to select a background frame may be a pointer to the background frame, an index that indicates the location of the background frame in a table or any other value that can be used to identify a background frame.

In one embodiment, blending and motion information for higher level background tracks in the multi-level background track 161 may be obtained by combining multiple sets of motion and blending information from a lower level background track. For example, the background motion and blending information ($BM_2$, $BB_2$) used to transition between background frames 62B in background track level two may be created by combining the background motion and blending information used to transition between background frames 62A and 64 with the background motion and blending information used to transition between background frames 64 and 63A. In an alternate embodiment, background motion and blending information for a higher level background track may be produced based on the background frames in the track and without using blending and motion information from a lower level background track.

FIG. 12 illustrates a multi-spatial resolution background frame. Each of the background frames in a background track of the multi-temporal resolution background track may include the various resolution background frames $BF_1$, $BF_2$ through $BF_N$. The background frame $BF_1$ is a maximum spatial resolution background frame and, in one embodiment, includes the same number of pixels as an original video frame. The background frame $BF_2$ has a lower spatial resolution than $BF_1$, meaning that $BF_2$ either has fewer pixels than $BF_1$ (i.e., is a smaller image) or has a larger block size. Block size refers to size, usually in pixels, of the elemental unit of visual information used to depict an image. A smaller block size yields a more spatially resolute image because finer elemental units are used to depict features of the image. A larger block size yields a less spatially resolute image, but requires less overall information because a single pixel value is applied to a group of pixels in a pixel block.

Figure 13:
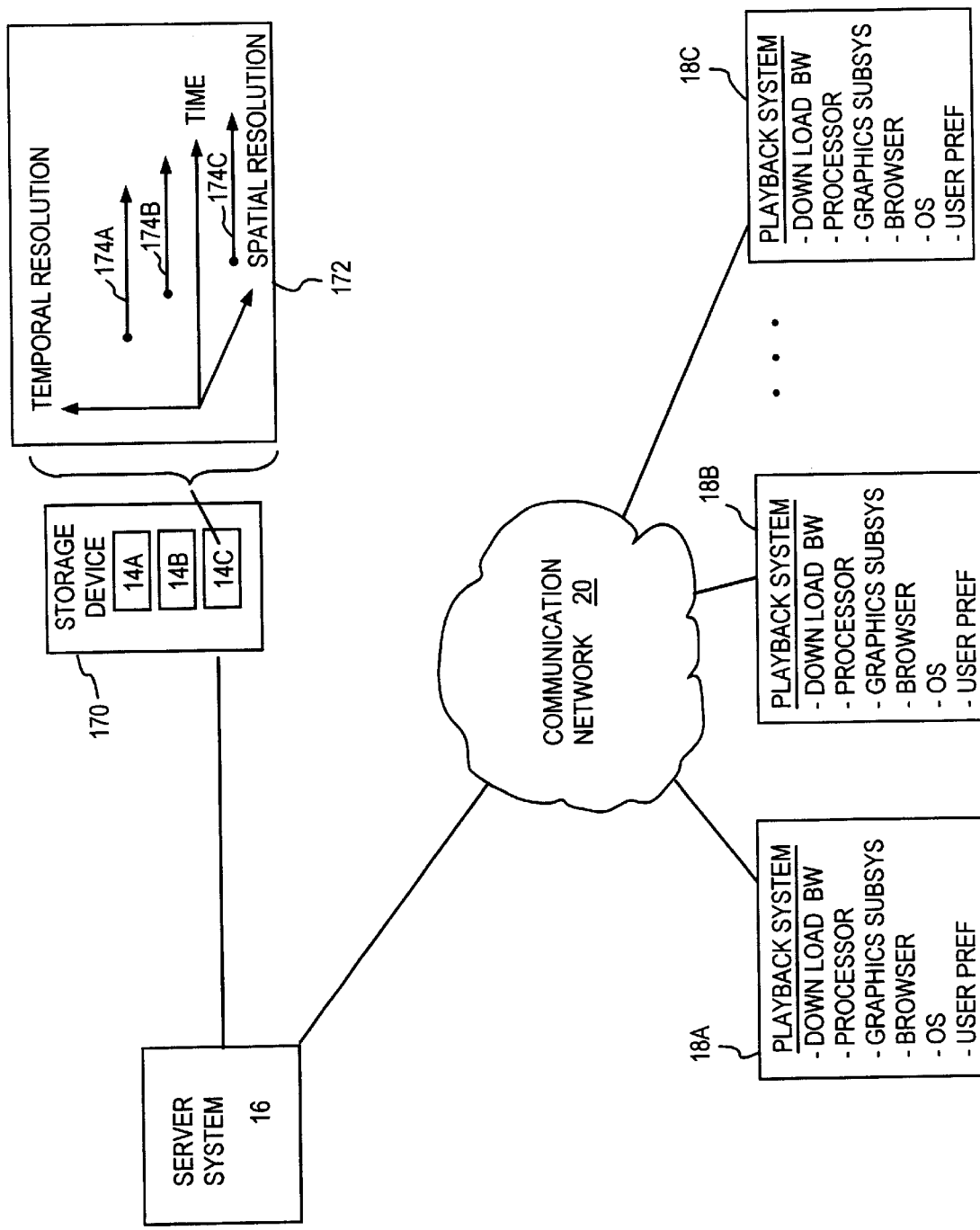
FIG. 13 illustrates the use of a server system to control the content of animation data streams being delivered to playback systems.

FIG. 13 illustrates the use of a server system 16 to control the content of animation data streams being delivered to playback systems 18A, 18B, 18C. According to one embodiment, the server system 16 receives requests to download various animation objects 14A, 14B, 14C stored in a computer-readable storage device 170. Before downloading an animation object, the server system 16 may first query the playback system 18A, 18B, 18C to determine the system's capabilities. For example, in response to a request from playback system 18A to download animation object 30C, the server system 16 may request the playback system 18A to provide a set of playback system characteristics which can be used by the server system 16 to generate an appropriate animation data stream. As shown in FIG. 13, the set of playback system characteristics associated with a given playback system 18A, 18B, 18C may include, but is not limited to, the download bandwidth of the playback system or its network access medium, the processing capability of the playback system (e.g., number of processors, speed of processors and so forth), the graphics capability of the playback system, the software application in use by the playback system (e.g., the type of web browser), the operating system on which the software application is executed and a set of user preferences. User preferences, may include a preference to sacrifice temporal resolution in favor of spatial resolution and vice-versa. Also, user preferences may be dynamically adjustable by the user of the playback system during animation download and display.

In one embodiment, the animation objects 14A, 14B, 14C are stored in a multi-temporal resolution and multi-spatial resolution formats and the server system 16 selects background and object tracks from an animation object (e.g., animation object 30C) having temporal and spatial resolutions best suited to the characteristics provided by the target playback system. Thus, as indicated by graph 172, the server system 16 may select different temporal/spatial resolution versions 174A, 174B, 174C of the same animation object 30C for download to playback systems 18A, 18B, 18C based on their respective characteristics. Further, the server system may dynamically adjust the temporal/spatial resolution of the animation provided to a given playback system 18A, 18B, 18C based on changes in playback system's characteristics.

Although FIG. 13 illustrates use of a server system to control the content of an animation data stream via a communication network, similar techniques may be applied within a playback system to dynamically select between multiple temporal and spatial resolution animation tracks. For example, selection logic within a playback system may provide an animation data stream to display logic within the playback system that has a temporal/spatial resolution appropriate to the characteristics of the playback system. For example, a DVD player may be designed to reduce the temporal or spatial resolution of an animation playback based on whether one or more other videos or animations are also being displayed (e.g., in another region of a display).

As mentioned above, it is an intended advantage of embodiments of the present invention to associate keyframes of an animation with video frames of a video source so that a user may switch between views of the animation and the video source during playback. This association between keyframes and video frames is referred to as "cross-linking" and can be particularly useful where one representation, animation or video, provides advantages over the other. For example, in an embodiment of an animation playback system described below, the user is informed during video playback when a sequence of video frames is linked to a still image that forms part of the animation. As discussed below, the still image may have a higher or more variable resolution, a wider field of view (e.g., a panoramic image), a higher dynamic range, or a different aspect ratio than the video frames. Also, the still image may contain stereo parallax information or other depth information to allow stereo three-dimensional (3D) viewing. When informed that a still image is available, the user may provide input to switch, on the fly, from the video presentation to an animation presentation to achieve the attendant advantages of the animation (e.g., higher resolution image). Alternatively, the user may pause the video presentation to navigate within a panoramic image of the animation or to zoom in or out on a still image of the animation. In other embodiments, the user may playback an animation and a video in a picture in picture mode or switch from a presentation of an animation to a cross-linked video.

In one embodiment, cross-linking involves generating still images from a video and then creating cross-links between the still images and frames of the video. In an alternate embodiment, the still images may be generated using a video other than the video to which they are cross-linked. Techniques for creating still images from a video are described below. It will be appreciated that other similar techniques may be also be used to create still images without departing from the spirit and scope of the present invention.

A still image having higher spatial resolution than frames of the video source can be achieved by integrating multiple video frames over time. Images in video frames that are temporally close together usually exhibit small positional shifts (e.g., sub-pixel motion) as a result of camera panning, zooming or other movement. The shift allows multiple video frames to be spatially registered to create a higher resolution image. High resolution still images can then be created by interpolating between adjacent pixels in the spatially registered video frames.

Alternatively, still images can be extracted from a second video source which exhibits higher resolution than the video to which the still images are linked. Motion pictures, for example, typically are recorded on films that have many times more resolution than the NTSC video format commonly used for video tapes.

A still image can also have a wider dynamic range than a video frame to which it is crosslinked. Dynamic range refers to the range of discernible intensity levels for each color component of a pixel in an image. Because the exposure setting of the camera may be changed from frame to frame to adapt to varying lighting conditions (e.g., auto iris), a sequence of video frames may exhibit subtle changes in color that can be integrated into a still image having increased dynamic range relative to the individual video frames. Also, a still image may be created from a video source (e.g., film) that has a wide dynamic range and then cross-linked with a video having narrower dynamic range.

A still image may also have a different aspect ratio than a video frame to which it is cross-linked. Aspect ratio refers to the ratio between the width and height of an image. For example, a still image may be created from a video source having a relatively wide aspect ratio, such as film, and then cross-linked with a different video source having a narrower aspect ratio, such as NTSC video. A typical aspect ratio for film is 2.2 by 1. NTSC video, by contrast, has a 4 by 3 aspect ratio.

Video frames that result from panning a camera can be registered and composited to create panoramas. Video frames that result from zooming a camera can be registered and composited to create a large still image that has different resolutions in different regions (i.e., a multi-resolution image). The region of a multi-resolution image where camera zooming has occurred will contain higher resolution than other regions of the multi-resolution image. Panoramas and multi-resolution still images are a class of images referred to herein as navigable images. Generally, a navigable image is any image which can be panned or zoomed to provide different views or that contains three dimensional images which can be used. Although panoramic and multi-resolution still images may be represented by composite images, a panoramic image or multi-resolution still image may also be represented by discrete still images that are spatially registered.

Stereo image pairs can be obtained from a sequence of video frames that exhibit horizontal camera tracking motions. Two video frames recorded from separate viewpoints (e.g., viewpoints separated by an inter-pupiary distance) may be selected from the video sequence as a stereo image pair. Stereo images can be presented using a number different stereo viewing devices, such as stereo 3D displays, stereo glasses and so forth.

Additionally, the stereo images can be analyzed using, for example, image correlation or feature matching techniques to identify corresponding pixels or image features in a given stereo image pair. The corresponding pixels or image features can then be used to establish the depth of the pixels and thus create a 3D range image. Range images can be used in a number of applications including constructing 3D models and the creation of novel views or scenes from images and interpolating between images to create novel views.

FIG. 14A illustrates the use of a cross-link generator 203 to establish cross-links between a video source 10 and an animation 14 that has been created from the video source 10 by an animation authoring system 12. The video source may be compressed by a video encoder 201 (e.g., a vector quantizer) before being received in the cross-link generator 203. According to one embodiment, the cross-link generator 203 generates a cross-linking data structure which includes respective pointers to keyframes in the animation to which frames in the video source correspond.

FIG. 14B illustrates the use of the cross-link generator 203 to establish cross-links between a video source 10 and an animation 205 that has been created from a separate video source 204. The separate video source 204 may have been used to produce the video source 10, or the two video sources 10, 204 may be unrelated. If the two video sources 10, 204 are unrelated, operator assistance may be required to identify which images in the animation 205 are to be cross-linked with frames of the video source 10. If the two video sources 10, 204 are related (e.g., one is a film, the other an NTSC-formatted video), then temporal correlation or scene correlation may be used by the cross-link generator to automatically cross-link images in the animation 205 and frames of the video source 10.

Figure 15:
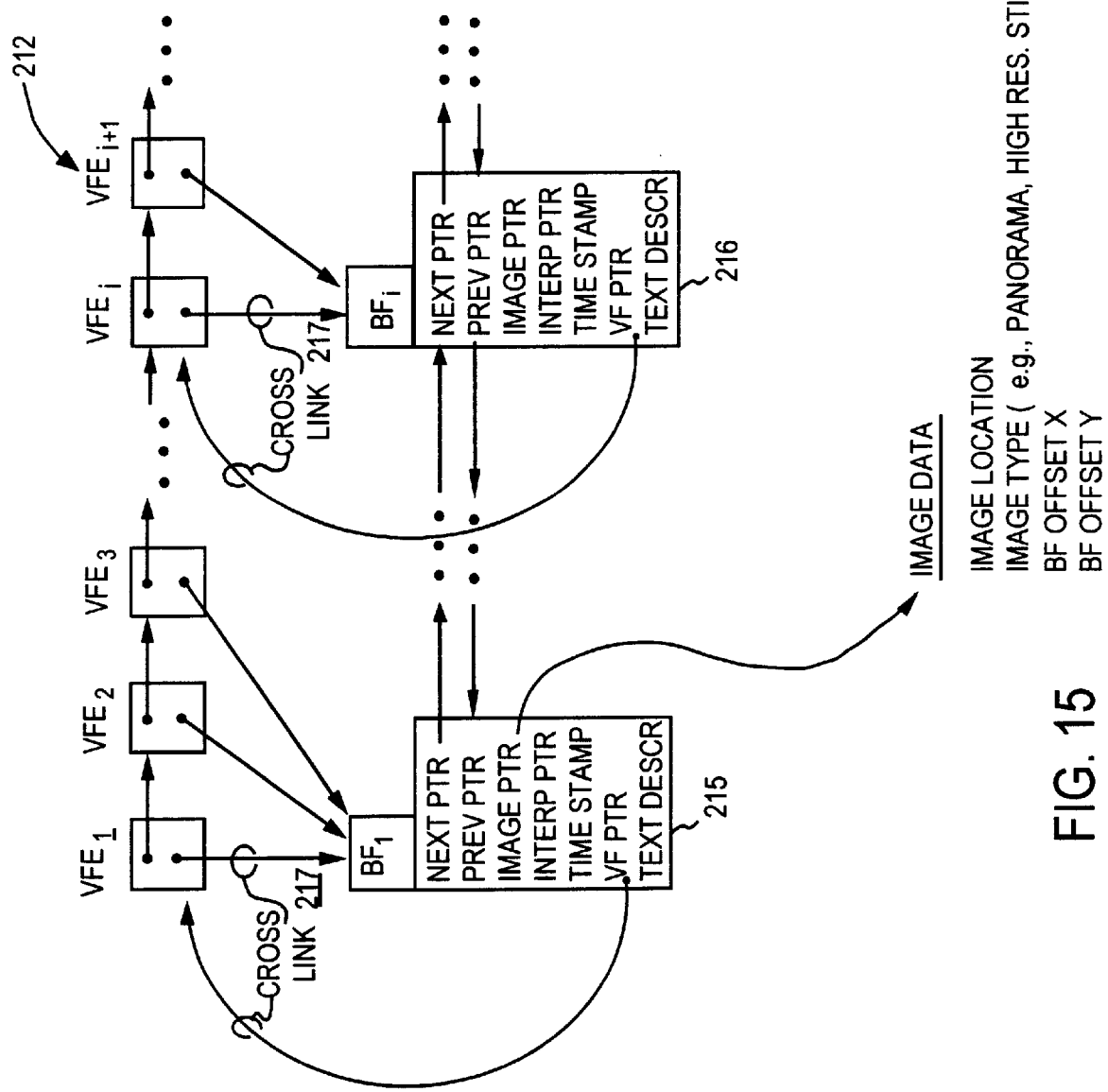
FIG. 15 illustrates a cross linking data structure according to one embodiment.

FIG. 15 illustrates a cross linking data structure 212 according to one embodiment. Each data element in the cross-linking data structure 212 is referred to as a video frame element (VFE) and corresponds to a respective frame of a video source. Thus, elements $VFE_1$, $VFE_2$, $VFE_3$, $VFE_i$, and $VFE_{i+1}$ correspond to frames $VF_1$, $VF_2$, $VF_3$, $VF_i$ and $VF_{i+1}$ (not shown) of a video source. As indicated, the cross-linking data structure 212 is implemented as a linked list in which each video frame element includes a pointer to the next video frame element and also a pointer to a background frame 215, 216 in an animation. In an alternate embodiment, the cross-linking data structure 212 may be implemented as an array of video frame elements rather than a linked-list. In yet another alternate embodiment, the cross-linking data structure 212 may be implemented as a tree data structure instead of a linked-list. Tree data structures are useful for establishing associations between non-adjacent video segments and for searching to find particular video frames. Generally, the cross-linking data structure may be represented by any type of data construct without departing from the spirit and scope of the present invention.

In one embodiment, the background frames in an animation are represented by background frame data structures 215, 216 that each include a pointer to the next background frame data structure (NEXT PTR), a pointer to the previous background frame data structure (PREV PTR), an image pointer (IMAGE PTR), a pointer to interpolation information (INTERP PTR), a timestamp and a pointer to one or more elements in the cross-linking data structure 212 (VF PTR). The NEXT PTR, PREV PTR, IMAGE PTR and INTERP PTR are as described above in reference to FIG. 8. The VF PTR in a particular background frame data structure 215, 216 and the pointer to the background frame data structure in a corresponding element of the cross-linking data structure 212 form a cross-link 217. That is, the background frame data structure and the video frame element include respective references to one another. The reference may be a uniform resource locator, a memory address, an array index or any other value for associating a background frame data structure and a video frame element.

Referring to the background frame data structure 215, although the VF PTR is illustrated in FIG. 15 as pointing only one video frame element ($VFE_1$) in the cross-linking data structure 212, the VF PTR may include separate pointers to each of the video frame elements which point back to it. For example, the VF PTR may be a data structure that includes separate pointers to each of video frame elements $VFE_1$, $VFE_2$, $VFE_3$. Alternatively, the VF PTR may be a data structure that includes a pointer to a video frame element (e.g., $VFE_1$) and a value indicating the total number of video frame elements to which the background frame data structure 215 is linked. Other data constructs for cross-linking a background frame data structure and a sequence of video frame elements may be used in alternate embodiments.

In one embodiment, the image pointer (IMAGE PTR) in each background frame data structure 215, 216 includes an image type member that indicates whether the background image from which the image data for the background frame is obtained is, for example, a non-composite still image (i.e., a video frame from which dynamic objects, if any, have been removed), a high resolution still image, a panorama or other composite image. The image pointer also includes members indicating the location of the background image in memory and the offset within the background image at which the image data for the background frame is located.

Figure 16:
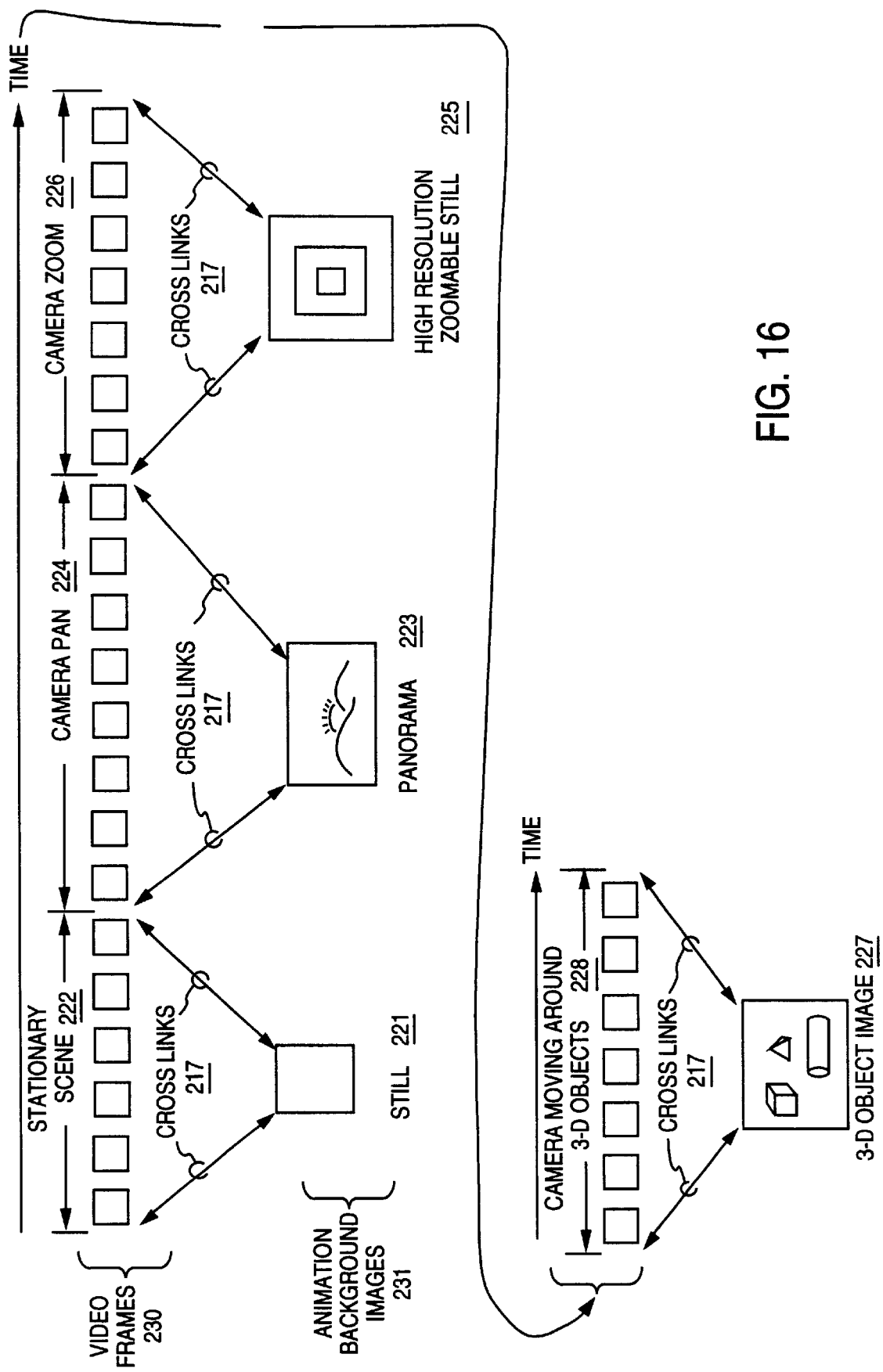
FIG. 16 is a diagram of a cross-linked relationship between a sequence of video frames in a video source and background images from an animation.

A text descriptor (TEXT DESCR) may also be included as part of the background frame data structure 215, 216. In on embodiment, the text descriptor is a pointer to a text description (e.g., a character string) that describes the portion of the animation that is spanned by the background frame. The text description may be displayed as an overlay on the animation or elsewhere on the display (e.g., a control bar). During cross-linking, appropriate default values may be assigned to respective text descriptions based on the type of motion that is identified. Referring to FIG. 16., for example, the default text descriptions for each of the three depicted animation segments 221, 223, 225 might be "Camera Still", "Camera Pan" and "Camera Zoom", respectively. These default values could be edited by a user during cross-linking or later during video or animation playback. In an alternate embodiment, the text descriptor (TEXT DESCR) in the background frame data structures 215, 216 is not a pointer but an index that can be used to select a text description from a table of text descriptions.

Using the above described cross-linking arrangement, when a video frame is being displayed, a corresponding video frame element of the cross-linking data structure 212 may be referenced to identify a cross-linked background frame data structure 215, 216 in the animation. The image pointer in the background frame data structure 215, 216 may then be referenced to determine whether the background frame is drawn from a composite or non-composite image. In the case of a composite image, a user may be notified (e.g., by a visual or audio prompt) that a composite image is available during playback of the video. The user may then select to playback the animation or to view and navigate within the background image. For example, in the case of a panorama, the user may view the panorama using a panorama viewing tool (i.e., a software program that can be executed on a general purpose computer to render user-selected portions of a composite image onto a display). Similarly, in the case of a high resolution still image, the user may wish to view the image as a still frame to discern detail that may have been unavailable or difficult to discern in the video source. In the case of zoomable still image, the user may with to zoom in and out on the still frame. Other animation-enabled activities may also be performed, such as selecting designated hot spots within the animation, isolating a dynamic object within the animation, directing object or background motions and so forth.

FIG. 16 is a diagram of a cross-linked relationship between a sequence of video frames 230 in a video source and background images 231 from an animation that has been created using the animation authoring techniques described above. As shown, the sequence of video frames includes four video segments 222, 224, 226, 228 each of which is associated with a respective background image 221,223,225, 227 via cross-links 217. Video segment 222 depicts a stationary scene (i.e., stationary within some motion threshold) and is cross linked to a corresponding still background image 221. Video segment 224 depicts a scene that is caused by camera panning and is cross-linked to a corresponding panorama 223 that has been created by processing and stitching two or more frames from the video segment 224. Video segment 226 depicts a scene that is caused by camera zooming and is cross-linked to a high-resolution, zoomable still image 225. Video segment 228 depicts a scene that is caused by moving a camera around one or more 3D objects and is cross-linked to a 3D object image. As described above, high resolution still images and 3D object images are created by processing and compositing frames from a video segment (e.g., video segments 222, 224, 226, 228).

Figure 17:
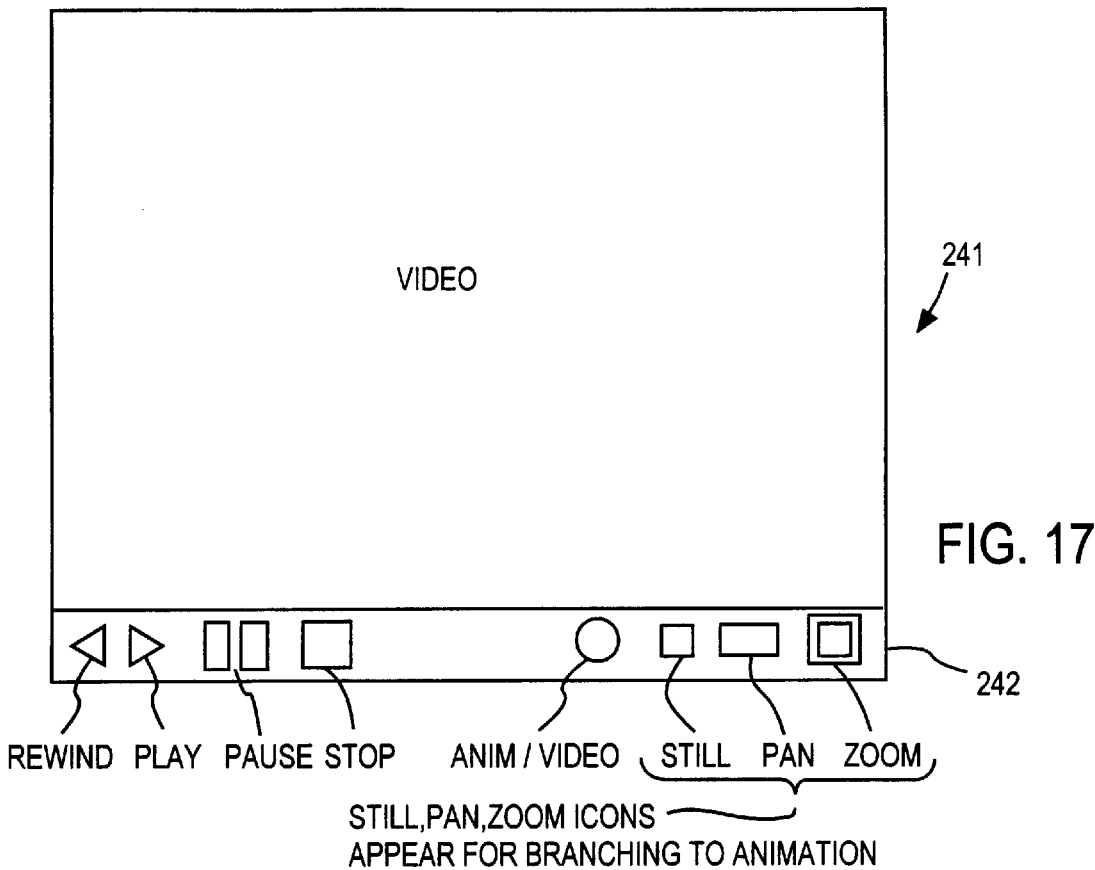
FIG. 17 depicts a display that has been generated by a playback system.

FIG. 17 depicts a display 241 that has been generated by a playback system. According to one embodiment, the playback system is capable of rendering either a video or an animation onto the display 241. As indicated in FIG. 17, the playback system is rendering a video on the display 241. At the bottom of the display 241, a control bar 242 is presented that includes rewind, play, pause and stop buttons. According to one embodiment, as each video frame is rendered, the cross link between the corresponding video frame element and a background frame in an animation is followed to determine if the background frame is drawn from a high resolution still image, panoramic image or zoomable image. If the background frame is, for example, drawn from a panoramic image, the icon indicated PAN in FIG. 17 is displayed, highlighted or otherwise indicated to be active. An audible tone may also be generated to indicate the availability of a panoramic image. In response to the indication that a panoramic image is available, the user may click on or otherwise select the PAN icon (e.g., using a cursor control device such as a mouse or other handheld control device) to cause display of the video to be paused and to cause the panoramic image to be displayed. When the panoramic image is displayed, program code for navigating the panoramic image may be automatically loaded into the playback system's operating memory, if not already resident, and executed to allow the user to pan, tilt and zoom the perspective view of the panorama. As with the PAN icon, when the still or zoom icons STILL, ZOOM become active, the user may click the appropriate STILL or ZOOM icon to view a high resolution still image or a zoomable image.

The video also can be linked to one or more three-dimensional objects or scenes related to the video. When a link to a three-dimensional object is invoked during the playback of the video, in a manner similar to that described above, a particular view of the three-dimensional object is Program code is executed to allow the user to change the orientation and position of a virtual camera in a three-dimensional coordinate system to generate different perspective views of the object.

In one embodiment, the control bar 242 also includes an icon ANIM/VIDEO that can be used to toggle between presentation of a video and presentation of an animation that has been cross-linked to the video. When the ANIM/VIDEO button is clicked by the user, the video frame element that corresponds to the currently displayed video frame is inspected to identify a cross-linked frame in the animation. The time stamp of the cross-linked frame in the animation is used to determine a relative starting time within the background and object tracks of the animation and the playback system begins rendering the animation accordingly. If, during playback of the animation, the user clicks the ANIM/VIDEO icon again, the current background track data structure is inspected to identify a cross-linked frame in the video. Video playback is then resumed at the cross-linked frame.

Figure 18:
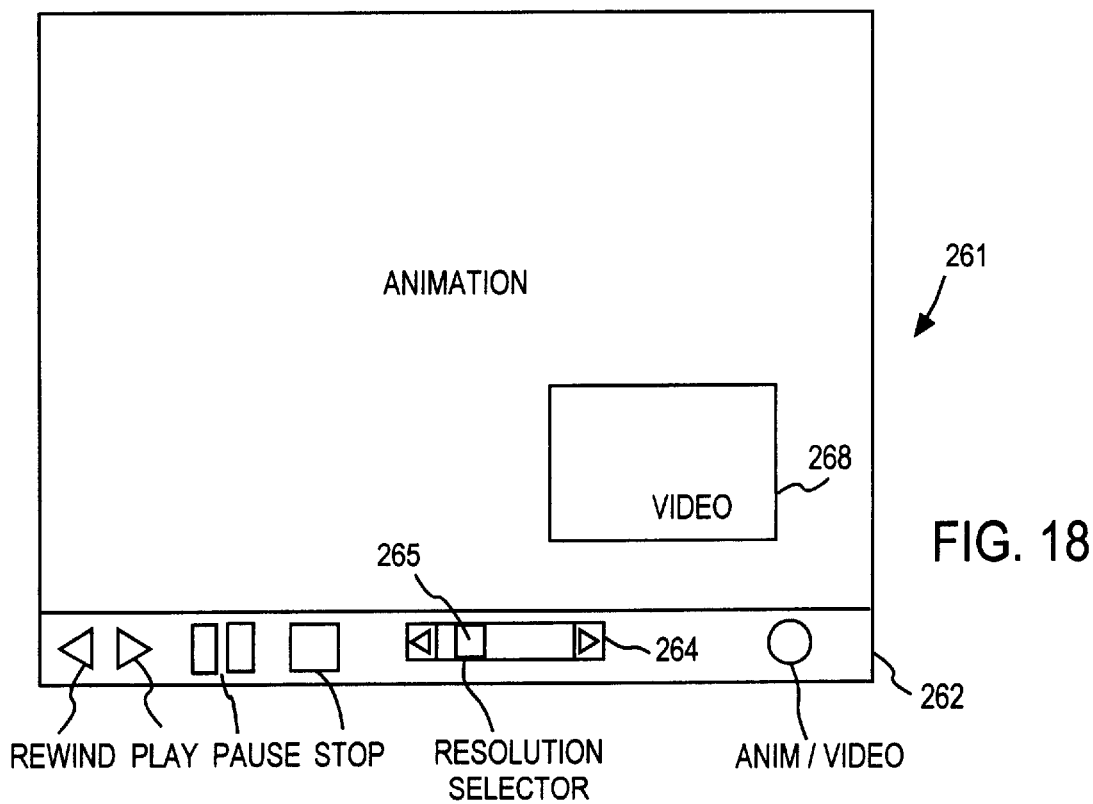
FIG. 18 depicts an alternate display that has been generated by a playback of an animation in a playback system.

FIG. 18 depicts an alternate display 261 that has been generated by a playback of an animation in a playback system. In one embodiment, a control bar 262 within the display 261 includes icons for rewinding, playing, pausing and stopping the animation playback (i.e., icons REWIND, PLAY, PAUSE, STOP). The control bar 262 also includes a resolution selector in the form of a slide bar 264 to allow the playback system user to indicate a relative preference for temporal and spatial resolution in the animation playback. By selecting the slide 265 with a cursor control device and moving the slide 265 left or right within the slide bar 264, a user is able to adjust the preference for spatial and temporal resolution. For example, with the slide 265 at the leftmost position within slide bar 264, a preference for maximum spatial resolution is indicated, and when the slide 265 is moved to the rightmost position within the slide bar 264, a preference for maximum temporal resolution is indicated.

An ANIM/VIDEO icon is present in the control bar 262 to allow the user to toggle between presentation of a video and an animation that have been cross-linked. According to the embodiment depicted in FIG. 18, when an animation has been selected for presentation, the cross-linked video is concurrently displayed within a sub-window 268 according to a picture-in-picture format. When the ANIN/VIDEO icon is clicked by a user, the video is presented in the primary viewing area of display 261 and the animation is presented in the sub-window 268. The picture-in-picture capability may be enabled or disabled from a menu (not shown) presented on display 261.

Cross-linking between an animation and a video can be used to provide a number of useful effects. For example, by cross-linking a navigable image of a marketplace to frames of a video that include a storefront, a user viewing the video may be prompted to switch to the panoramic image to shop for goods and services depicted in the marketplace. Transactions for the goods and services may be carried out electronically via a communication network. Cross-linking a navigable image and a video would be particularly effective where the navigable image is a panorama or other composite image of a location in a scene of the video. For example, if a video included a navigable environment (e.g., an airplane, spaceship, submarine, cruise ship, building and so forth). Imagine, for example, a video scene in which a character on a cruise ship walked past a souvenir shop. The viewer could stop the video and browse the souvenir shop, in a spontaneous and intuitive manner.

Another useful application of cross-linking would be to allow a user to configure a video. A user could link animation sequences to the video so that the animation sequence is automatically invoked when a cross-linked frame of the video is reached. When the end of the animation sequence is reached, display of the video may be resumed at another cross-linked video frame. A user could selectively add out-takes to scenes in a video or replace portions of the video with animation sequences.

In the foregoing specification, the invention has been described with reference to specific exemplary embodiments thereof. It will, however, be evident that various modifications and changes may be made to the specific exemplary embodiments without departing from the broader spirit and scope of the invention as set forth in the appended claims. Accordingly, the specification and drawings are to be regarded in an illustrative rather than a restrictive sense.

What is claimed is:

1. A computer-implemented method of creating an animation, the method comprising:

inspecting a sequence of video images to identify a first transformation of a scene depicted in the sequence of video images;

obtaining a first image and a second image from the sequence of video images, the first image representing the scene before the first transformation and the second image representing the scene after the first transformation; and generating transformation information that describes an interpolation between the first image and the second image to produce a video effect that approximates display of the sequence of video images.

2. The method of claim 1 wherein inspecting a sequence of video images to identify a first transformation of a scene comprises determining when a difference between a selected one of the video images and a subsequent one of the video images exceeds a threshold, the selected one of the video images and the subsequent one of the video images indicating a starting image and an ending image, respectively, of a segment of the video images.

3. The method of claim 2 wherein the starting image of the segment of the video images indicates an ending image of a previous segment of the video images.

4. The method of claim 2 wherein determining when a difference between a selected one of the video images and a subsequent one of the video images exceeds a threshold comprises:

selecting from the sequence of video images a video image that succeeds the starting image;

comparing the video image that succeeds the starting image to an adjacent preceding video image from the sequence of video images to generate an incremental difference value;

adding the incremental difference value to a sum of incremental difference values; and repeating the acts of selecting, comparing and adding until the sum of incremental difference values exceeds the threshold.

5. The method of claim 4 wherein the subsequent one of the video images is the video image used to generate an incremental difference which, when added to the sum of incremental differences, causes the sum of incremental differences to exceed the threshold.

6. The method of claim 5 wherein the ending image of the set of video images is adjacent to the subsequent one of the video images.

7. The method of claim 2 wherein the difference between the selected one of the video images and the subsequent one of the video images includes a difference caused by a change in disposition of a camera used to record the sequence of video images.

8. The method of claim 2 wherein the difference between the selected one of the video images and the subsequent one of the video images includes a difference in color.

9. The method of claim 2 wherein the difference between the selected one of the video images and the subsequent one of the video images includes a difference in time elapsed between the selected video image and the subsequent one of the video images.

10. The method of claim 2 wherein obtaining the first image and the second image from the sequence of video images comprises selecting the starting image and the ending image of the set of video images to be the first image and the second image, respectively.

11. The method of claim 2 wherein obtaining the second image from the sequence of video images comprises:

identifying one or more dynamic objects in the ending image; and removing the one or more dynamic objects to produce the second image.

12. The method of claim 11 wherein identifying one or more dynamic objects in the ending image comprises identifying one or more features in the set of video images that undergo a second transformation in the set of video images that is not indicated by the first transformation.

13. The method of claim 12 wherein the second transformation includes a change in disposition of the one or more dynamic objects that does not result from a change in disposition of a camera used to record the sequence of video images.

14. The method of claim 1 wherein generating transformation information that describes an interpolation between the first image and the second image comprises:
generating a value that indicates a measure of change between the first image and the second image;
generating a value that indicates a time that should elapse between display of the first image and display of the second image.

15. The method of claim 14 wherein generating a value that indicates a measure of change comprises generating a value that indicates a measure of change caused by a change in disposition of a camera used to record the sequence of video images.

16. The method of claim 14 wherein generating a value that indicates a measure of change comprises generating a value that indicates a measure of color change.

17. A computer-implemented method of creating an animation, the method comprising:
identifying a first transformation of a scene depicted in a sequence of video images, the first transformation indicating a change in disposition of a camera used to record the sequence of video images;
identifying a second transformation of the scene depicted in the sequence of video images, the second transformation indicating a change in disposition of an object in the scene;
removing respective regions that contain the object from first and second images of the sequence of video images to generate first and second background images; and
generating background transformation information that describes an interpolation between the first and second background images to produce interpolated background images, the interpolated background images being displayable to approximate the first transformation of the scene.

18. The method of claim 17 further comprising:
generating first and second object images that contain the respective regions removed from the first and second images of the sequence of video images, the first object image representing the dynamic object before the second transformation and the second object image representing the dynamic object after the second transformation; and
generating object transformation information that describes an interpolation between the first and second object images to produce interpolated object images, the interpolated object images being displayable to approximate the change in disposition of the object in the scene.

19. The method of claim 18 further comprising storing the first and second background images and the background transformation information within a background track in an animation object; and
storing the first and second object images and the object information in an object track in the animation object.

20. The method of claim 19 further comprising transmitting the animation object across a computer network in response to a request from an animation playback device.

21. An animation authoring system comprising:
a background track generator to inspect a sequence of video images and to generate a background track therefrom, the background track including a sequence of background frames and transformation information describes an interpolation between the background frames to synthesize additional images;
an object track generator to inspect the sequence of video images and to generate an object track therefrom, the object track including a sequence of object frames and transformation information that describes an interpolation between the object frames to synthesize additional object images.

22. The animation authoring system of claim 21 further comprising an animation object generator to store the background track and the object track in an animation object for later recall.

23. An animation delivery system comprising the animation authoring system of claim 22 and further comprising a communication device to receive a request to download the animation object from one or more client devices and to transmit the animation object to the one or more client devices in response.

24. The animation authoring system of claim 22 wherein playback timing information is stored in the animation object to indicate relative playback times for the object track and the background track.

25. The animation authoring system of claim 21 wherein at least one of the background track generator and the object track generator is implemented by a programmed processor.

26. The animation authoring system of claim 21 wherein the background track generator comprises:
a scene change estimator to resolve the sequence of video images into one or more video segments;
a background motion estimator to generate the transformation information based on respective transformations in the one or more video segments; and
a background frame constructor to generate the sequence of background frames based on the respective transformations in the one or more video segments.

27. The animation authoring system of claim 26 wherein the background track generator further comprises a blending estimator to generate blending information for combining background frames in the sequence of background frames.

28. The animation authoring system of claim 27 wherein the blending information indicates a cross-dissolve operation.

29. The animation authoring system of claim 26 wherein the background frame constructor generates at least one background frame of the sequence of background frames by compositing one or more images from the one or more video segments.

30. The animation authoring system of claim 29 wherein the background frame constructor composites the one or more images by stitching the one or more images into a panoramic image.

31. The animation authoring system of claim 29 wherein the background frame constructor combines the one or more images into a high resolution image.

32. A computer-readable medium having instructions stored thereon which, when executed by a processor, causes the processor to:
inspect a sequence of video images to identify a first transformation of a scene depicted in the sequence of video images;
obtain a first image and a second image from the sequence of video images, the first image representing the scene before the first transformation and the second image representing the scene after the first transformation; and
generate transformation information that describes an interpolation between the first image and the second image to produce a video effect that approximates display of the sequence of video images.

33. The computer-readable medium of claim 32 wherein the computer-readable medium includes one or more mass storage disks.

34. The computer-readable medium of claim 33 wherein the computer-readable medium is a computer data signal encoded in a carrier wave.

35. The computer-readable medium of claim 33 wherein the instructions which cause the processor to inspect the sequence of video images to identify a first transformation of a scene include instructions which, when executed, cause the processor to determine when a difference between a selected one of the video images and a subsequent one of the video images exceeds a threshold, the selected one of the video images and the subsequent one of the video images indicating a starting image and an ending image, respectively, of a set of the video images.

36. The computer-readable medium of claim 35 wherein the instructions which cause the processor to determine when a difference between a selected one of the video images and a subsequent one of the video images exceeds a threshold include instructions which, when executed, cause the processor to:

select from the sequence of video images a video image that succeeds the starting image;

compare the video image that succeeds the starting image to an adjacent preceding video image from the sequence of video images to generate an incremental difference value;

add the incremental difference value to a sum of incremental difference values; and repeat the acts of selecting, comparing and adding until the sum of incremental difference values exceeds the threshold.

* * * * *